(12) United States Patent
Oyamada et al.

(10) Patent No.: US 10,609,092 B2
(45) Date of Patent: Mar. 31, 2020

(54) IMAGE DISPLAY SYSTEM

(71) Applicants: Kei Oyamada, Kanagawa (JP); Junichi Hara, Kanagawa (JP); Taeko Ishizu, Kanagawa (JP)

(72) Inventors: Kei Oyamada, Kanagawa (JP); Junichi Hara, Kanagawa (JP); Taeko Ishizu, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 135 days.

(21) Appl. No.: 15/110,835

(22) PCT Filed: Jan. 20, 2015

(86) PCT No.: PCT/JP2015/051948
§ 371 (c)(1),
(2) Date: Jul. 11, 2016

(87) PCT Pub. No.: WO2015/115345
PCT Pub. Date: Aug. 6, 2015

(65) Prior Publication Data
US 2016/0337409 A1    Nov. 17, 2016

(30) Foreign Application Priority Data

Jan. 30, 2014 (JP) .................. 2014-015274
Nov. 27, 2014 (JP) .................. 2014-239818

(51) Int. Cl.
*H04L 29/06* (2006.01)
*G06F 3/14* (2006.01)

(52) U.S. Cl.
CPC ........ *H04L 65/1069* (2013.01); *G06F 3/1438* (2013.01); *G09G 2370/022* (2013.01); *G09G 2370/027* (2013.01)

(58) Field of Classification Search
CPC . G06F 13/00; G06F 3/1438; G09G 2370/022; G09G 2370/027; H04L 65/1069
See application file for complete search history.

(56) References Cited

U.S. PATENT DOCUMENTS 6,741,276 B1 *  5/2004  Yonezawa ............... H04N 7/18
                                              348/143
8,237,787 B2 *  8/2012  Hollinger ............. H04N 5/2252
                                              348/151
(Continued)

FOREIGN PATENT DOCUMENTS

CN        1829942 A      9/2006
CN       102148861 A     8/2011
(Continued)

OTHER PUBLICATIONS

Partial European Search Report dated Feb. 22, 2017 in Patent Application No. 15743015.8.
(Continued)

*Primary Examiner* — Kostas J Katsikis
(74) *Attorney, Agent, or Firm* — Oblon, McClelland, Maier & Neustadt, L.L.P.

(57) ABSTRACT

An image display system including a plurality of terminals and at least one image display apparatus capable of communicating with the terminals via a network. The image display system includes a first storage part configured to store a connection information list used for connecting to the image display apparatus on the network, an update part configured to add, update, or delete connection information included in the connection information list stored in the first storage part to update the stored connection information list, a searching part configured to search the network for the terminals storing the connection information list, and an acquisition part configured to acquire the connection information list from the terminals detected by the searching part.

(Continued)

The update part updates the connection information list stored in the first storage part in accordance with the connection information list acquired by the acquisition part.

18 Claims, 31 Drawing Sheets

(56) References Cited

U.S. PATENT DOCUMENTS

| | | | | |
|---|---|---|---|---|
| 9,277,165 | B2* | 3/2016 | Hiroike | G06F 17/30793 |
| 2002/0080250 | A1* | 6/2002 | Ogawa | H04N 1/00278 |
| | | | | 348/231.6 |
| 2002/0138471 | A1* | 9/2002 | Dutta | G06F 17/30867 |
| 2004/0146203 | A1* | 7/2004 | Yoshimura | G08B 13/187 |
| | | | | 382/218 |
| 2004/0208159 | A1 | 10/2004 | Jung et al. | |
| 2004/0215810 | A1* | 10/2004 | Tan | H04L 29/06027 |
| | | | | 709/232 |
| 2004/0222983 | A1* | 11/2004 | Kakemura | G06F 3/1431 |
| | | | | 345/204 |
| 2004/0267891 | A1* | 12/2004 | Hoeye | G03B 19/00 |
| | | | | 709/206 |
| 2005/0005109 | A1* | 1/2005 | Castaldi | G06F 21/606 |
| | | | | 713/165 |
| 2005/0110953 | A1* | 5/2005 | Castaldi | G03B 21/26 |
| | | | | 353/30 |
| 2005/0189471 | A1* | 9/2005 | Nagasawa | G06K 9/00805 |
| | | | | 250/208.1 |
| 2005/0231639 | A1* | 10/2005 | Kubota | H04N 1/00283 |
| | | | | 348/552 |
| 2006/0007400 | A1* | 1/2006 | Castaldi | G03B 21/26 |
| | | | | 353/30 |
| 2006/0013508 | A1* | 1/2006 | Morichika | G06F 3/017 |
| | | | | 382/312 |
| 2006/0033884 | A1* | 2/2006 | Sato | G06F 3/0386 |
| | | | | 353/30 |
| 2006/0080543 | A1* | 4/2006 | Yen | G09G 3/002 |
| | | | | 713/183 |
| 2006/0158616 | A1* | 7/2006 | Borger | A63F 13/02 |
| | | | | 353/69 |
| 2007/0038735 | A1* | 2/2007 | Tsunoda | H04N 1/00127 |
| | | | | 709/223 |
| 2007/0040819 | A1* | 2/2007 | Inazumi | G09G 5/003 |
| | | | | 345/204 |
| 2007/0040993 | A1* | 2/2007 | Yokoyama | G03B 21/26 |
| | | | | 353/42 |
| 2007/0098238 | A1* | 5/2007 | Obrador | G06T 15/205 |
| | | | | 382/128 |
| 2007/0146833 | A1* | 6/2007 | Satomi | G11B 27/034 |
| | | | | 358/537 |
| 2009/0129290 | A1 | 5/2009 | Seo et al. | |
| 2009/0185572 | A1* | 7/2009 | Yasuma | H04L 12/4625 |
| | | | | 370/401 |
| 2010/0007578 | A1* | 1/2010 | Kikuchi | G06F 3/0481 |
| | | | | 345/2.2 |
| 2010/0079585 | A1* | 4/2010 | Nemeth | H04N 13/337 |
| | | | | 348/54 |
| 2010/0321647 | A1* | 12/2010 | Schuler | G06F 1/3203 |
| | | | | 353/121 |
| 2011/0026600 | A1* | 2/2011 | Kenji | H04N 19/70 |
| | | | | 375/240.24 |
| 2011/0051020 | A1* | 3/2011 | Kotani | H04N 9/3164 |
| | | | | 348/744 |
| 2011/0064330 | A1* | 3/2011 | Hikichi | H04N 1/00347 |
| | | | | 382/305 |
| 2011/0170402 | A1* | 7/2011 | Kikuchi | H04L 41/12 |
| | | | | 370/216 |
| 2012/0113459 | A1* | 5/2012 | Williams | G06F 3/1206 |
| | | | | 358/1.15 |
| 2012/0128241 | A1* | 5/2012 | Jung | G06K 9/00711 |
| | | | | 382/165 |
| 2012/0179737 | A1* | 7/2012 | Baranov | H04W 76/023 |
| | | | | 709/201 |
| 2012/0204099 | A1* | 8/2012 | Yamada | G06F 3/0483 |
| | | | | 715/244 |
| 2012/0239618 | A1* | 9/2012 | Kung | G06F 21/6218 |
| | | | | 707/621 |
| 2012/0256738 | A1* | 10/2012 | Egawa | G06F 13/385 |
| | | | | 340/286.02 |
| 2012/0268488 | A1* | 10/2012 | Masuko | G06T 3/4038 |
| | | | | 345/629 |
| 2013/0040623 | A1* | 2/2013 | Chun | H04N 21/4126 |
| | | | | 455/414.2 |
| 2013/0081089 | A1* | 3/2013 | Kim | H04N 21/4122 |
| | | | | 725/61 |
| 2013/0083251 | A1* | 4/2013 | Kotani | H04N 21/4222 |
| | | | | 348/734 |
| 2013/0207995 | A1* | 8/2013 | Yoshida | G06F 3/1454 |
| | | | | 345/600 |
| 2013/0297839 | A1* | 11/2013 | Chai | G06F 13/385 |
| | | | | 710/62 |
| 2014/0028787 | A1* | 1/2014 | Banno | H04N 7/15 |
| | | | | 348/14.08 |
| 2014/0078244 | A1* | 3/2014 | Kitazawa | H04N 7/147 |
| | | | | 348/14.08 |
| 2014/0095615 | A1* | 4/2014 | Ito | H04W 4/21 |
| | | | | 709/204 |
| 2014/0168168 | A1* | 6/2014 | Ichieda | G06F 3/042 |
| | | | | 345/175 |
| 2014/0210861 | A1* | 7/2014 | Abe | G06T 3/40 |
| | | | | 345/660 |
| 2014/0313419 | A1* | 10/2014 | Kim | H04N 21/25891 |
| | | | | 348/734 |
| 2014/0313420 | A1* | 10/2014 | Kim | H04N 5/4403 |
| | | | | 348/734 |
| 2014/0354821 | A1* | 12/2014 | Monroe | H04N 7/18 |
| | | | | 348/159 |
| 2015/0002890 | A1* | 1/2015 | Okuno | G06F 3/1294 |
| | | | | 358/1.15 |
| 2015/0009532 | A1* | 1/2015 | Tsugimura | G06F 3/1292 |
| | | | | 358/1.15 |
| 2015/0010213 | A1* | 1/2015 | Lin | G08B 13/19602 |
| | | | | 382/106 |
| 2015/0067129 | A1* | 3/2015 | Hayashi | H04L 12/1827 |
| | | | | 709/223 |
| 2015/0089336 | A1* | 3/2015 | Sirpal | H04L 65/403 |
| | | | | 715/202 |
| 2015/0091778 | A1* | 4/2015 | Day | G06F 3/1446 |
| | | | | 345/1.3 |
| 2015/0163505 | A1* | 6/2015 | Sato | H04N 19/159 |
| | | | | 375/240.12 |
| 2015/0172530 | A1* | 6/2015 | Shintani | H04N 1/00307 |
| | | | | 348/211.8 |
| 2015/0296247 | A1* | 10/2015 | Glasser | H04L 65/4084 |
| | | | | 725/74 |
| 2015/0326915 | A1* | 11/2015 | Jaynes | H04N 21/25825 |
| | | | | 725/82 |
| 2016/0055826 | A1* | 2/2016 | Abe | G06F 3/1423 |
| | | | | 345/2.3 |
| 2016/0142978 | A1* | 5/2016 | Annaka | G06F 1/32 |
| | | | | 370/311 |
| 2016/0337409 | A1* | 11/2016 | Oyamada | G06F 3/1438 |

FOREIGN PATENT DOCUMENTS

| | | |
|---|---|---|
| JP | 2002-342057 | 11/2002 |
| JP | 2004-318852 | 11/2004 |
| JP | 2005-197969 | 7/2005 |
| JP | 2007-043725 | 2/2007 |
| JP | 2008262034 A * | 10/2008 |
| JP | 2009-053733 | 3/2009 |
| JP | 2010-211472 | 9/2010 |
| JP | 2012-059294 | 3/2012 |
| WO | 2004/109453 A2 | 12/2004 |

(56) References Cited

OTHER PUBLICATIONS

International Search Report dated Apr. 14, 2015 in PCT/JP2015/051948 filed on Jan. 20, 2015.
Combined Office Action and Search Report dated Mar. 26, 2018 in Chinese Patent Application No. 201580005907.X (with English translation of categories of cited documents), 17 pages.

* cited by examiner

FIG.5

| IP ADDRESS | IMAGE PROJECTION APPARATUS NAME | NUMBER OF CONNECTION TIMES | FINAL CONNECTION DATE AND TIME | CONSTANT USE | CONNECTION VERIFICATION RESULT | DELETION DETERMINATION RESULT |
|---|---|---|---|---|---|---|
| 192.168.11.8 | PJ03 | 3 | 2013/10/01/ 09:30 | OFF | SUCCESSFUL | SAVE |
| 192.168.11.10 | PJ02 | 8 | 2013/12/10/ 11:00 | OFF | SUCCESSFUL | SAVE |
| 192.168.11.11 | PJ01 | 12 | 2013/12/01/ 15:20 | ON | FAILED | SAVE |
| 192.168.12.13 | PJ04 | 0 | – | OFF | SUCCESSFUL | SAVE |

FIG.6

| IP ADDRESS | IMAGE PROJECTION APPARATUS NAME | NUMBER OF CONNECTION TIMES | FINAL CONNECTION DATE AND TIME | CONSTANT USE | CONNECTION VERIFICATION RESULT | DELETION DETERMINATION RESULT |
|---|---|---|---|---|---|---|
| 192.168.11.11 | PJ01 | 12 | 2013/12/01/ 15:20 | ON | FAILED | SAVE |
| 192.168.11.10 | PJ02 | 8 | 2013/12/10/ 11:00 | OFF | SUCCESSFUL | SAVE |
| 192.168.11.8 | PJ03 | 3 | 2013/10/01/ 09:30 | OFF | SUCCESSFUL | SAVE |
| 192.168.12.13 | PJ04 | 0 | – | OFF | SUCCESSFUL | SAVE |

FIG.7

| IP ADDRESS | IMAGE PROJECTION APPARATUS NAME | NUMBER OF CONNECTION TIMES | FINAL CONNECTION DATE AND TIME | CONSTANT USE | CONNECTION VERIFICATION RESULT | DELETION DETERMINATION RESULT |
|---|---|---|---|---|---|---|
| 192.168.11.8 | PJ03 | 3 | 2013/10/01/ 09:30 | OFF | SUCCESSFUL | SAVE |
| 192.168.11.11 | PJ01 | 12 | 2013/12/01/ 15:20 | ON | FAILED | SAVE |
| 192.168.11.10 | PJ02 | 8 | 2013/12/10/ 11:00 | OFF | SUCCESSFUL | SAVE |
| 192.168.12.13 | PJ04 | 0 | - | OFF | SUCCESSFUL | SAVE |

FIG.14A

| IP ADDRESS | IMAGE PROJECTION APPARATUS NAME | NUMBER OF CONNECTION TIMES | FINAL CONNECTION DATE AND TIME | CONSTANT USE | CONNECTION VERIFICATION RESULT | DELETION DETERMINATION RESULT |
|---|---|---|---|---|---|---|
| 192.168.11.8 | PJ03 | 3 | 2013/10/01/ 09:30 | OFF | SUCCESSFUL | SAVE |
| 192.168.11.10 | PJ01 | 12 | 2013/12/01/ 15:20 | ON | SUCCESSFUL | SAVE |
| 192.168.11.11 | PJ02 | 8 | 2013/12/10/ 11:00 | OFF | SUCCESSFUL | SAVE |

FIG.14B

| IP ADDRESS | IMAGE PROJECTION APPARATUS NAME | NUMBER OF CONNECTION TIMES | FINAL CONNECTION DATE AND TIME | CONSTANT USE | CONNECTION VERIFICATION RESULT | DELETION DETERMINATION RESULT |
|---|---|---|---|---|---|---|
| 192.168.12.3 | PJ13 | 2 | 2013/09/01/ 09:30 | OFF | SUCCESSFUL | SAVE |
| 192.168.12.51 | PJ11 | 11 | 2013/11/01/ 15:20 | ON | SUCCESSFUL | SAVE |
| 192.168.12.70 | PJ12 | 7 | 2013/12/10/ 11:00 | OFF | SUCCESSFUL | SAVE |

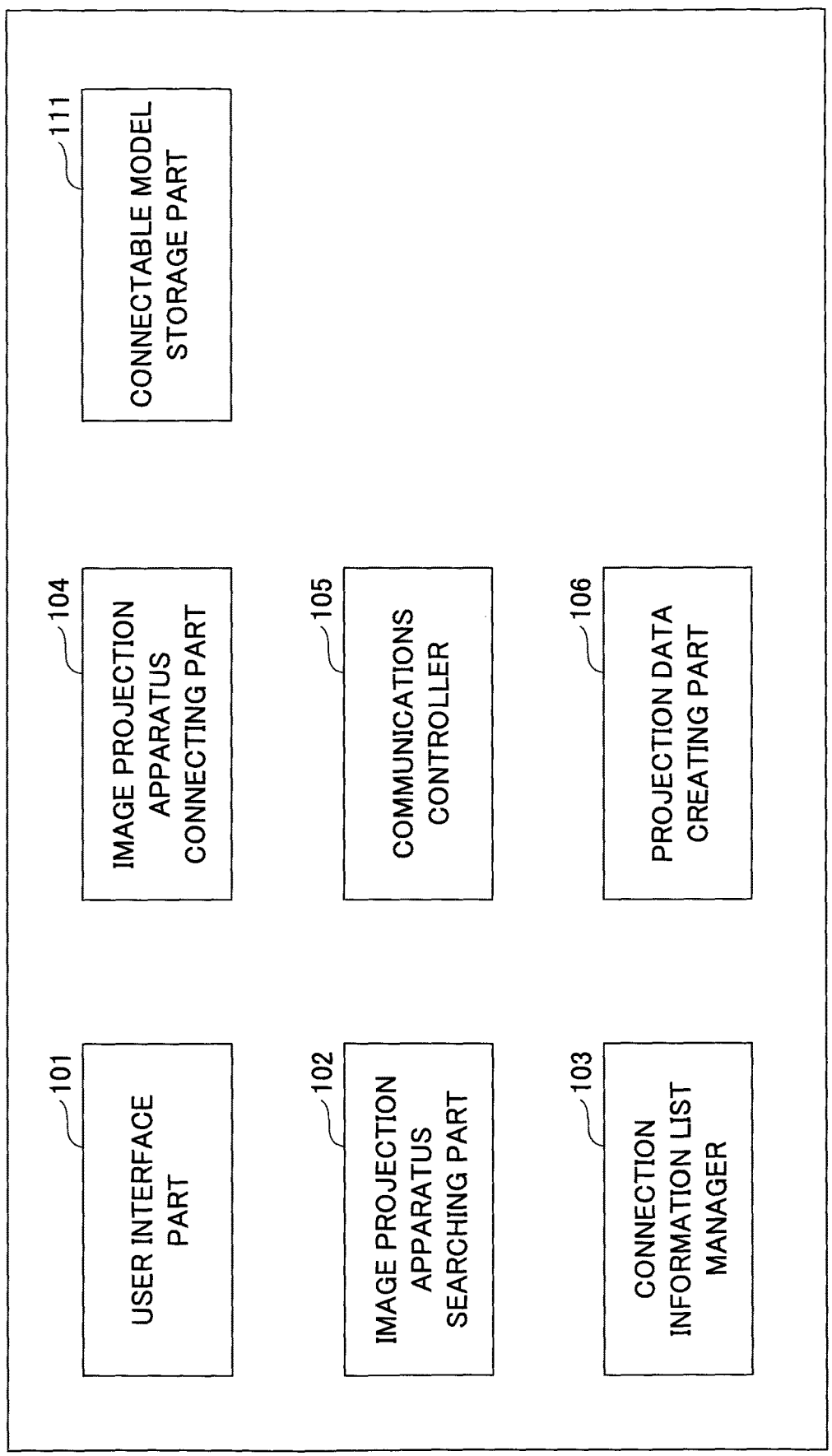

FIG.16

| CONNECTABLE MODEL | CONNECTABLE SOFTWARE VERSION |
|---|---|
| Type A | Ver. 1.3.0 AND LATER VERSIONS |
| Type B | Ver. 3.0.0 AND LATER VERSIONS |

FIG.17

| IP ADDRESS | IMAGE PROJECTION APPARATUS NAME | MODEL NAME | SOFTWARE VERSION | NUMBER OF CONNECTION TIMES | FINAL CONNECTION DATE AND TIME | CONSTANT USE | CONNECTION VERIFICATION RESULT | DELETION DETERMINATION RESULT |
|---|---|---|---|---|---|---|---|---|
| 192.168.1.11 | PJ01 | Type A | Ver. 1.3.0 | 12 | 2013/12/01/ 15:20 | ON | FAILED | SAVE |
| 192.168.1.10 | PJ02 | Type B | Ver. 1.1.0 | 8 | 2013/12/10/ 11:00 | OFF | SUCCESSFUL | SAVE |
| 192.168.11.8 | PJ03 | Type B | Ver. 3.0.0 | 3 | 2013/10/01/ 09:30 | OFF | SUCCESSFUL | SAVE |
| 192.168.12.13 | PJ04 | Type C | Ver. 1.0.0 | 0 | - | OFF | SUCCESSFUL | SAVE |

FIG.18

| IP ADDRESS | IMAGE PROJECTION APPARATUS NAME | MODEL NAME | SOFTWARE VERSION | NUMBER OF CONNECTION TIMES | FINAL CONNECTION DATE AND TIME | CONSTANT USE | CONNECTION VERIFICATION RESULT | DELETION DETERMINATION RESULT |
|---|---|---|---|---|---|---|---|---|
| 192.168.1.11 | PJ01 | Type A | Ver. 1.3.0 | 12 | 2013/12/01/ 15:20 | ON | FAILED | SAVE |
| 192.168.1.8 | PJ03 | Type B | Ver. 3.0.0 | 3 | 2013/10/01/ 09:30 | OFF | SUCCESSFUL | SAVE |

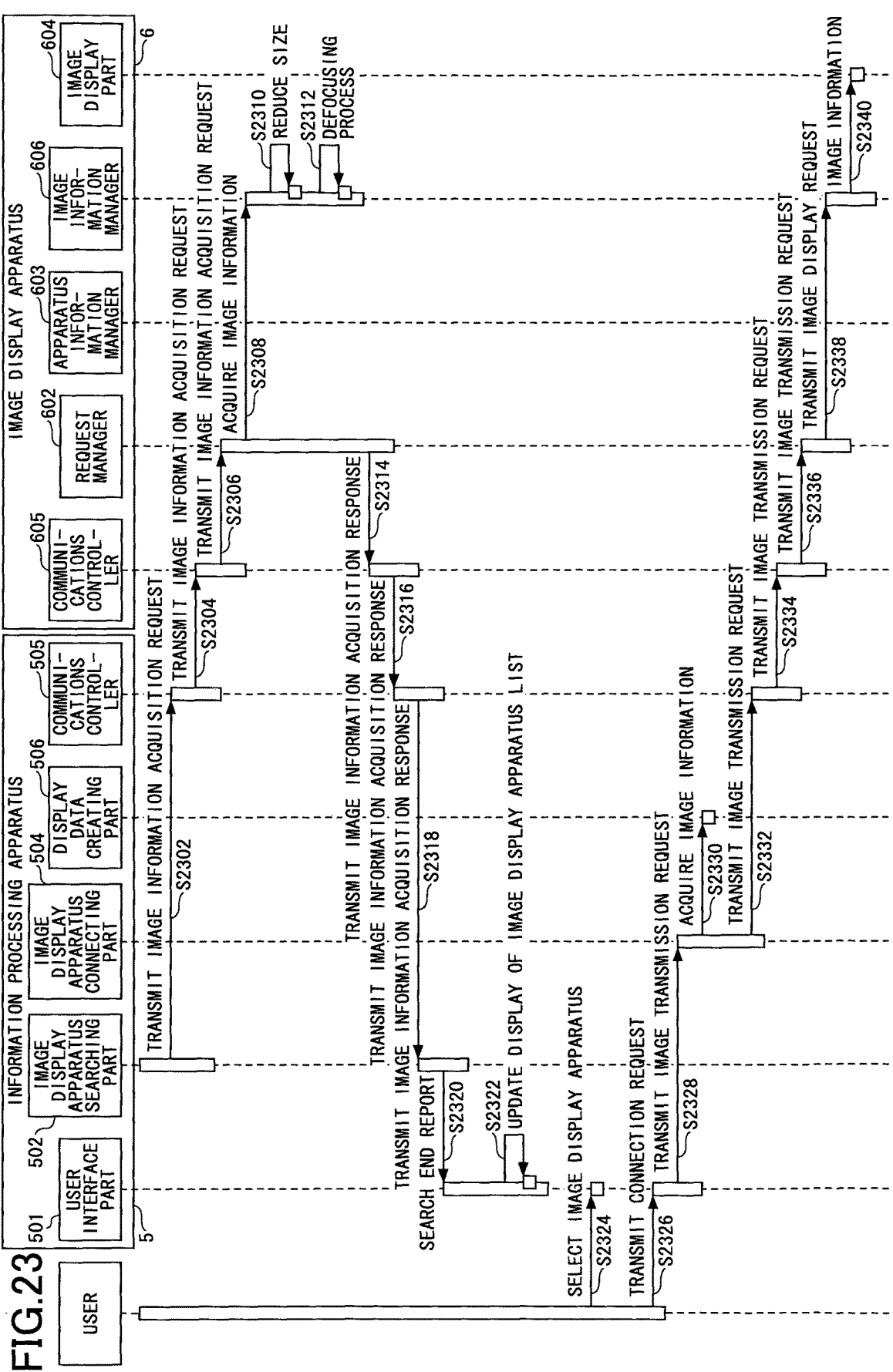

FIG.24A

| REDUCTION REQUIREMENT | REQUIRED |
|---|---|
| REQUIRED IMAGE SIZE | 100 × 100 |

FIG.24B

| REDUCTION REQUIREMENT | UNREQUIRED |
|---|---|
| REQUIRED IMAGE SIZE | – |

FIG.25A

| IMAGE DISPLAY STATUS | DISPLAY |
|---|---|
| IMAGE ACQUISITION CAPABILITY SETTING | CAPABLE |
| INTERRUPTION CONNECTION CAPABILITY SETTING | CAPABLE |
| IMAGE TRANSMISSION SOURCE USER NAME | user01 |
| IMAGE FILE NAME | - |
| IMAGE | IMAGE DATA |

FIG.25B

| IMAGE DISPLAY STATUS | NON-DISPLAY |
|---|---|
| IMAGE ACQUISITION CAPABILITY SETTING | - |
| INTERRUPTION CONNECTION CAPABILITY SETTING | - |
| IMAGE TRANSMISSION SOURCE USER NAME | - |
| IMAGE FILE NAME | - |
| IMAGE | - |

FIG.25C

| IMAGE DISPLAY STATUS | DISPLAY |
|---|---|
| IMAGE ACQUISITION CAPABILITY SETTING | INCAPABLE |
| INTERRUPTION CONNECTION CAPABILITY SETTING | INCAPABLE |
| IMAGE TRANSMISSION SOURCE USER NAME | user01 |
| IMAGE FILE NAME | - |
| IMAGE | - |

FIG.25D

| IMAGE DISPLAY STATUS | DISPLAY |
|---|---|
| IMAGE ACQUISITION CAPABILITY SETTING | CAPABLE |
| INTERRUPTION CONNECTION CAPABILITY SETTING | CAPABLE |
| IMAGE TRANSMISSION SOURCE USER NAME | - |
| IMAGE FILE NAME | file01 |
| IMAGE | IMAGE DATA |

IMAGE DISPLAY SYSTEM

TECHNICAL FIELD

The disclosures discussed herein relate to an image display system.

BACKGROUND ART

There is a technology for causing an image display apparatus to display images capable of being displayed on an information processing apparatus such as personal computers by connecting the information processing apparatus and the image display apparatus via an image transmission cable to transmit image signals from the information processing apparatus to the image display apparatus. Further, since network environments have widely spread, the image data created in the information processing apparatus may be transmitted to the image display apparatus via the network, and the image display apparatus may expand and display the received image data.

There is disclosed a technology known in the related art to provide the information processing apparatus with connection information of a display apparatus from a connection information management server that manages the connection information of the image display apparatus including an Internet protocol (IP) in association with a location at which the image display apparatus is installed (e.g., see Patent Document 1).

SUMMARY OF THE INVENTION

Problems to be Solved by the Invention

In order to connect the information processing apparatus to the image display apparatus on the network, time and labor may be required for a user to search for connection information such as the IP address of the image display apparatus on the network, and input the acquired information into the information processing apparatus.

However, in the related art technology disclosed in Patent Document 1, to acquire the connection information of the image display apparatus from the connection management server to connect the information processing apparatus to the image display apparatus, the information processing apparatus may easily be connected to the image display apparatus without a user's directly inputting the connection information such as an IP address into the image display apparatus.

However, when the connection information of the image display apparatus or an installed location of the image display apparatus on the network is changed, the connection information management server may require time and labor to change the connection information of the image display apparatus.

Further, in an environment in which plural image display apparatuses are installed, it may be difficult to connect the information processing apparatus to an appropriate one of the image display apparatuses via the network. Moreover, it may be difficult to identify one of the image display apparatuses that is connected to the information processing apparatus.

Accordingly, it is a general object in one embodiment of the present invention to provide an image display system capable of reducing time and labor for connecting the information processing apparatus to the image display apparatus on the network that substantially obviates one or more problems caused by the limitations and disadvantages of the related art.

Means for Solving the Problems

According to an aspect of the present invention, there is provided an image display system including a plurality of terminals, and at least one image display apparatus capable of communicating with the terminals via a network. The image display system includes a first storage part configured to store a connection information list used for connecting to the image display apparatus on the network; an update part configured to add, update, or delete connection information included in the connection information list stored in the first storage part to update the stored connection information list; a searching part configured to search the network for the terminals storing the connection information list; and an acquisition part configured to acquire the connection information list from the terminal detected by the searching part. In the image display system, the update part updates the connection information list stored in the first storage part in accordance with the connection information list acquired by the acquisition part.

Effects of the Present Invention

According to an aspect of embodiments, it may be possible to reduce time and labor for connecting the information processing apparatus to the image display apparatus on the network.

BRIEF DESCRIPTION OF THE DRAWINGS

FIG. 5 is a diagram illustrating a data configuration example of a connection information list according to the first embodiment;

FIG. 6 is a diagram illustrating an example of the connection information list rearranged in an ascending order in accordance with a number of connection times;

FIG. 7 is a diagram illustrating an example of the connection information list rearranged in an ascending order in accordance with the last connection date and time;

FIGS. 14A and 14B are diagrams illustrating examples of the connection information list displaying image projection apparatuses existing in a segment to which the information processing apparatus belongs;

FIG. 15 is a block diagram illustrating a functional configuration example of image projection software installed in an information processing apparatus according to a second embodiment;

FIG. 16 is a diagram illustrating a data configuration example of connectable model information according to the second embodiment;

FIG. 17 is a diagram illustrating a data configuration example of a connection information list of image projection apparatuses according to the second embodiment;

FIG. 18 is a diagram illustrating a data configuration example of a connection information list of image projection apparatuses to which connectable model information according to the second embodiment is reflected;

FIG. 23 is a sequence diagram illustrating an example (2) of operations of the image display system;

FIGS. 24A and 24B are diagrams illustrating examples of a data structure of an image information acquisition request;

FIGS. 25A to 25D are diagrams illustrating examples of additional information;

BEST MODE FOR CARRYING OUT THE INVENTION

In the following, a description is given of preferred embodiments with reference to accompanying drawings.

System Configuration

Figure 1:
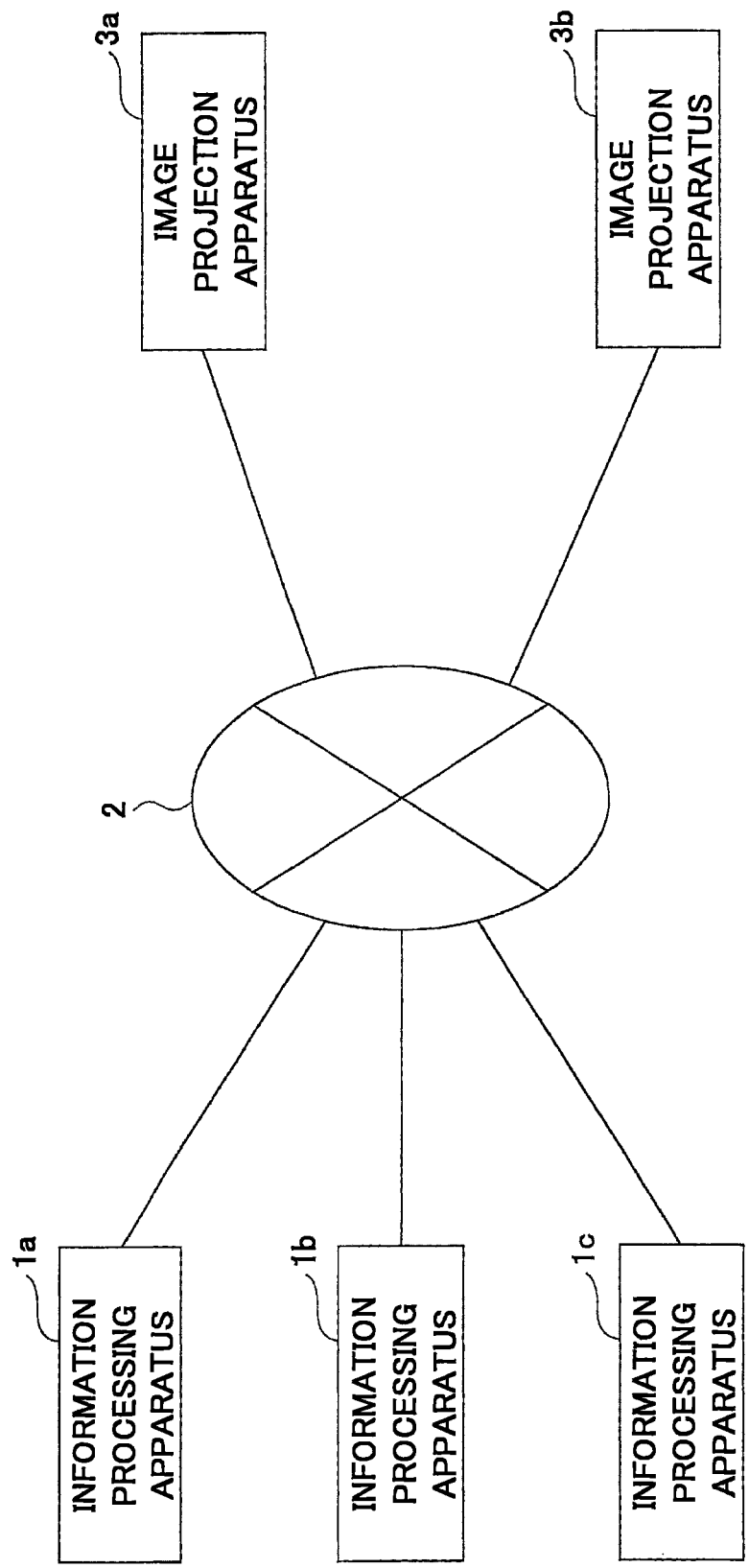
FIG. 1 is a diagram illustrating a configuration example of an image projection system according to an embodiment.

FIG. 1 is a diagram illustrating an overall configuration of an image projection system.

The image projection system includes information processing apparatuses 1 (1a to 1c), image projection apparatuses 3 (3a and 3b), and a network 2 to which the information processing apparatuses 1a to 1c, and the image projection apparatus 3a and 3b are connectable.

The information processing apparatuses 1a to 1c have software installed to execute image projection by the image projection apparatuses 3. The software is configured to prepare image data desired to be projected, and transmit the prepared image data to the image projection apparatuses 3 via the network 2.

The image projection apparatuses 3a and 3b that have received the image data project onto projection surfaces. The image projection apparatuses 3a and 3b may be displays connectable to the network.

The information processing apparatuses 1a to 1c and the image projection apparatuses 3a and 3b may belong to an identical segment of the network, or may belong to separate segments when they are able to communicate with one another via a router. In the former case, the image projection apparatuses 3a and 3b may be detected by broadcasting; however, in the latter case, IP addresses of the image projection apparatuses 3a and 3b need to be prepared in advance.

Note that generally described information processing apparatuses and image projection apparatuses are provided with reference numbers without any alphabetic characters. For example, the information processing apparatuses 1a to 1c are referred to simply as the information processing apparatus 1. Further, the image projection apparatuses 3a and 3b are referred to simply as the image projection apparatus 3.

The numbers of the information processing apparatuses 1 and the image projection apparatuses 3 connected to the network 2 are not limited to the numbers of the information processing apparatuses 1 and the image projection apparatuses 3 illustrated in FIG. 1. The numbers of the information processing apparatuses 1 and the image projection apparatuses 3 connectable to the network 2 may be increased.

Hardware Configuration

Figure 2:
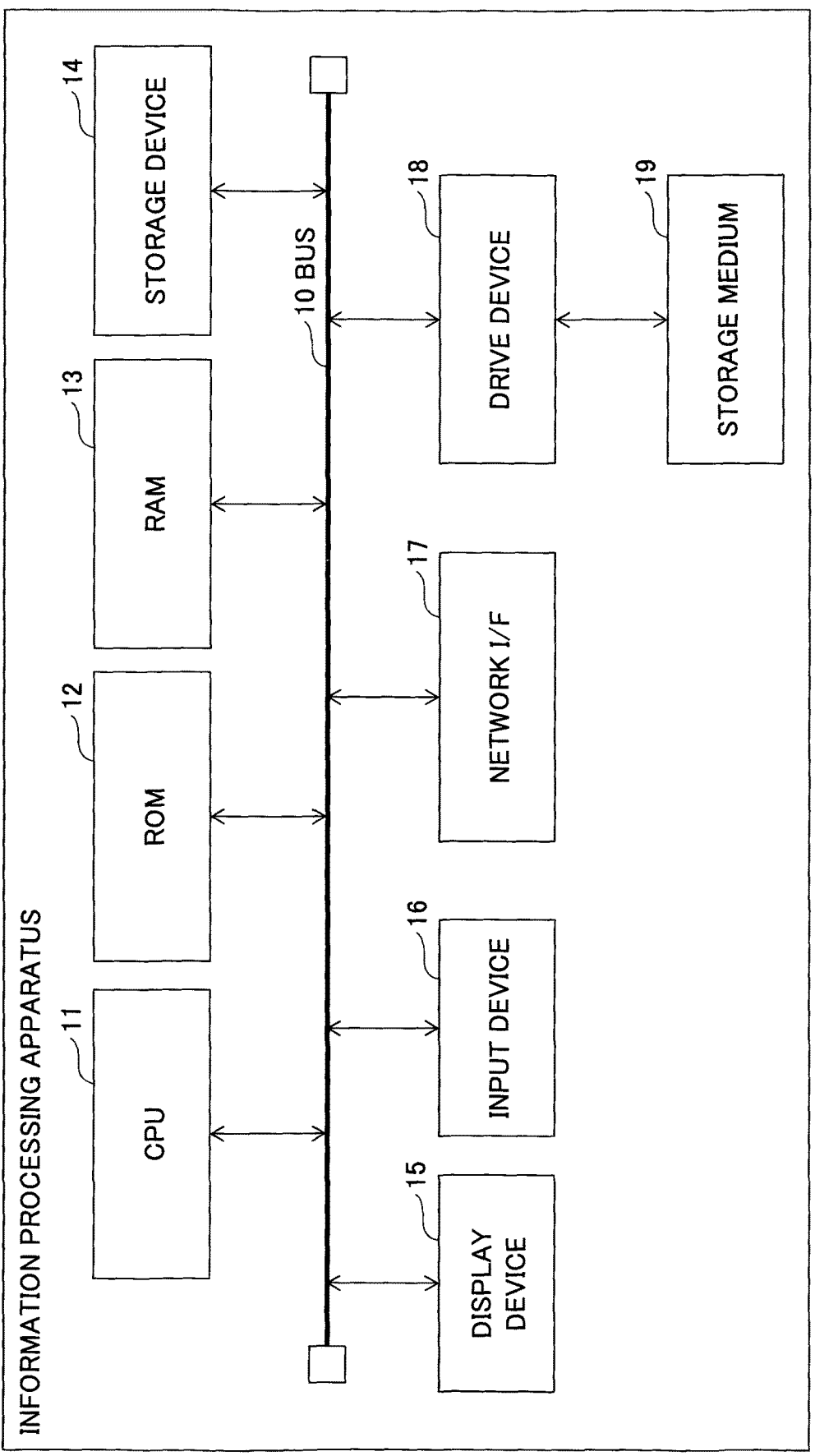
FIG. 2 is a block diagram illustrating a hardware configuration example of an information processing apparatus according to an embodiment.

FIG. 2 is a diagram illustrating a hardware configuration example of the information processing apparatus 1 of the image projection system. The information processing apparatus 1 is configured to include a central processing unit (CPU) 11, a read only memory (ROM) 12, a random access memory (RAM) 13, a storage device 14, a display device 15, an input device 16, a network interface (I/F) 17, and a drive device 18 that are connected one another via a bus 10.

The CPU 11 is configured to read programs in the RAM 13 to execute the programs. The ROM 12 is a nonvolatile semiconductor memory (a storage device) capable of maintaining internal data even if the power is turned off. The ROM 12 is configured to store data such as system settings and network-related settings. The RAM 13 is a volatile memory (a storage device) configured to temporarily store programs and data read from the ROM 12. The RAM 13 is utilized as a work area (in which programs or data are temporarily loaded) of the CPU 11. The storage device 14 may be a hard disk drive (HDD) or a solid state drive (SSD) having a large capacity of a storage area, and is configured to store and maintain programs or various types of data.

The display device 15 may be a display and the like, and is configured to display various types of windows or information. The input device 16 may be a keyboard or a mouse, and is configured to allow a user to input various operations signals into the information processing apparatus 1. The network I/F 17 is utilized for connecting the information processing apparatus 1 to a predetermined data transmission line or the network 2.

The drive device 18 is configured to read data from a storage medium 19, or write data into the storage medium 19. The storage medium 19 may be various types of storage medium such as a compact disk read-only memory (a CD-ROM), and a magneto-optical disk.

Figure 3:
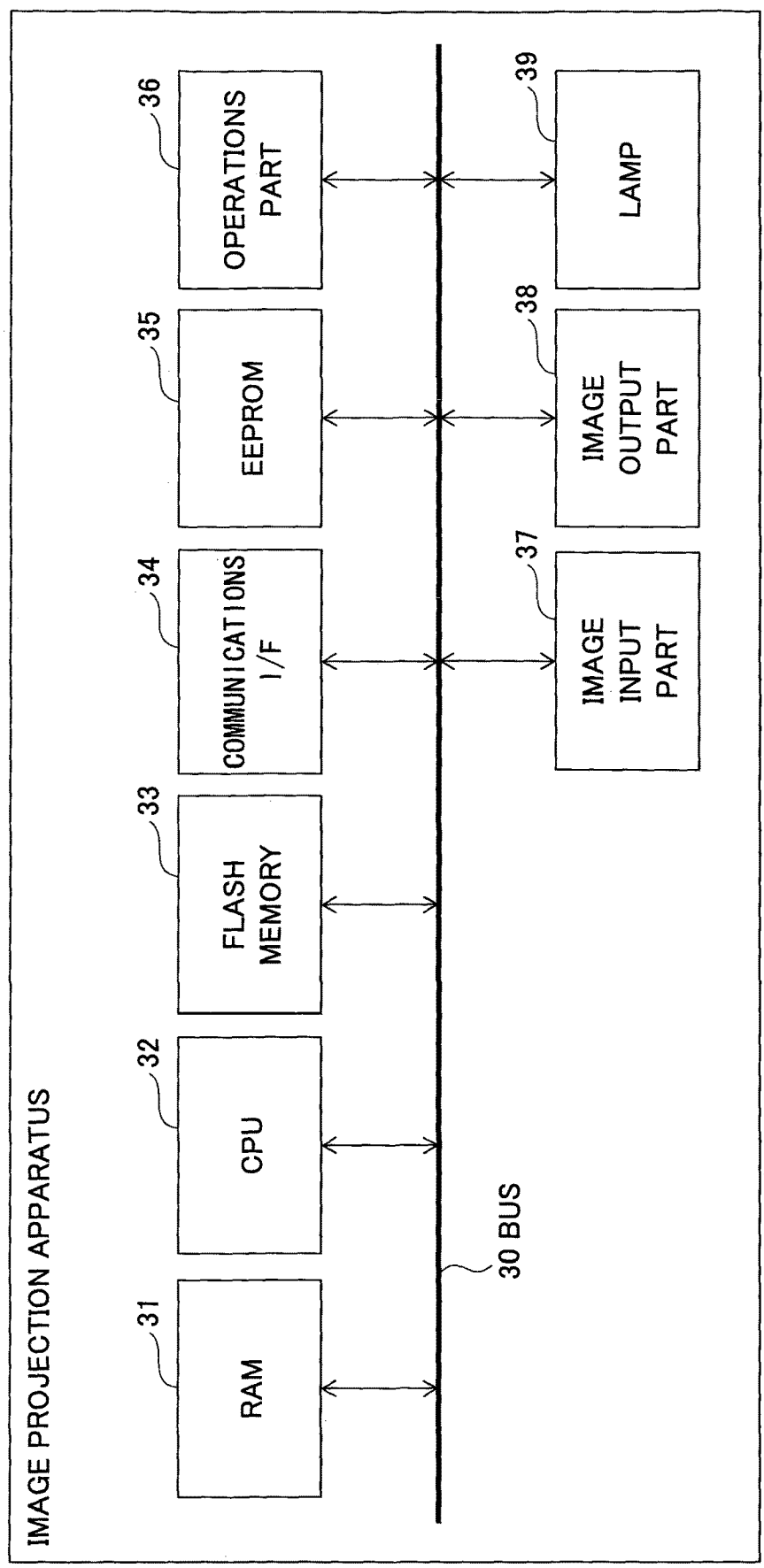
FIG. 3 is a block diagram illustrating a hardware configuration example of the image projection apparatus according to the embodiment.

FIG. 3 is a diagram illustrating a hardware configuration example of the image projection apparatus 3 of the image projection system. The image projection apparatus 3 includes a random access memory (RAM) 31, a central processing unit (CPU) 32, a flash memory 33, a communications interface (I/F) 34, an electrically erasable programmable read-only memory (EEPROM) 35, an operations part 36; an image input part 37, an image output part 38, and a lamp 39 that are connected to one another via a bus 30.

The RAM 31 is configured to store temporarily read programs and data to be executed by the CPU 32. The CPU 32 is configured to execute programs to control the entire apparatus. The flash memory 33 and the EEPROM 35 are configured to store various types of data such as image data and audio (sound-voice) data.

The communications I/F 34 is configured to communicate image data with the information processing apparatus 1 via the data transmission line or the network 2. The operations part 36 is configured to receive operations from a user, and perform operations to adjust brightness of images, volume of sound, and the like.

The image input part 37 is configured to receive image data input from the information processing apparatus 1 connected via the communications I/F 34. The image output part 38 may be a liquid crystal display apparatus, and is configured to output the image of the image data received from the image input part 37. The lamp 39 may be a halogen lamp, and is configured to output light so as to project the image output from the image output part 38 on a projection surface via a not-illustrated projection lens.

First Embodiment

Figure 4:
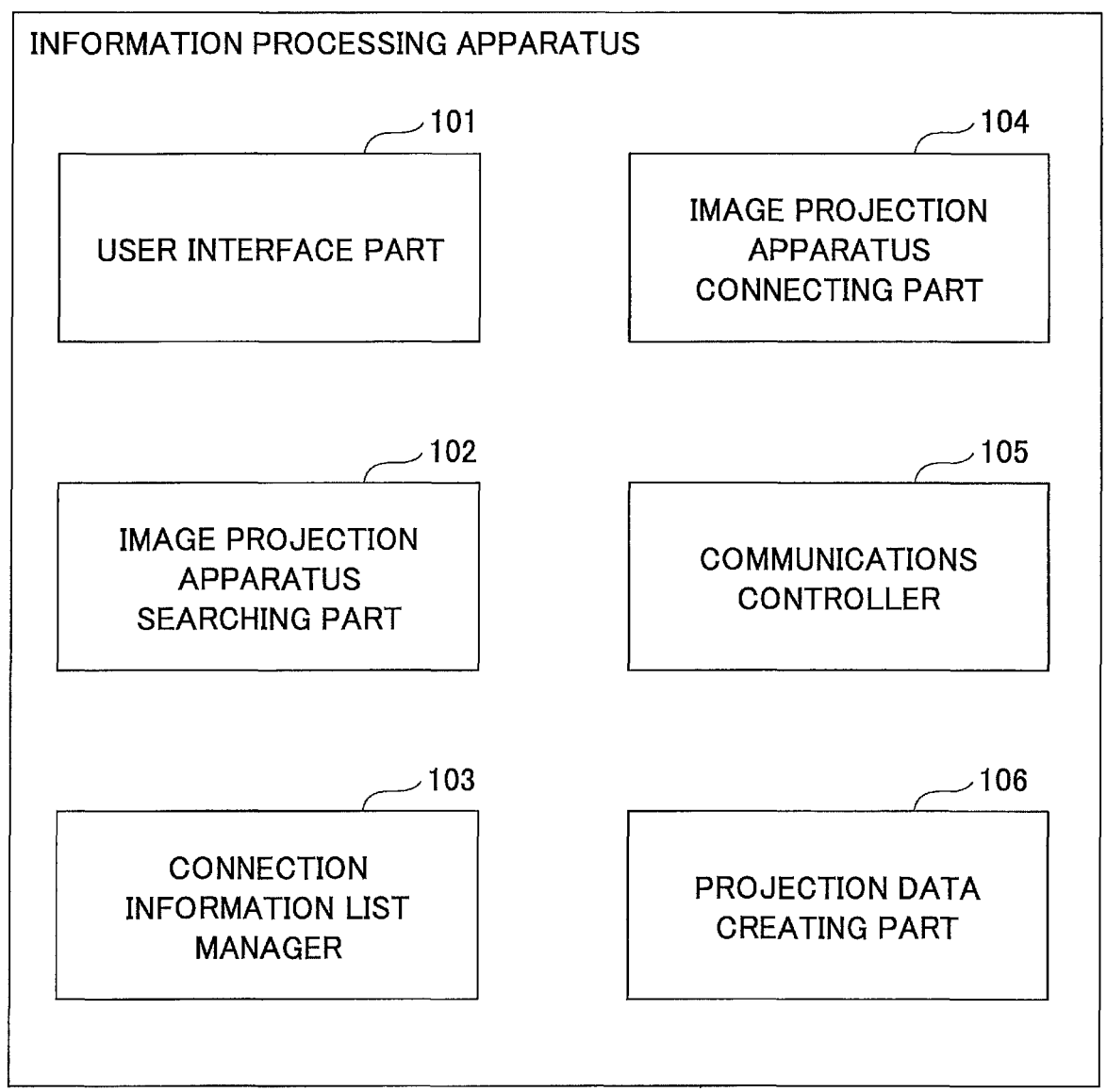
FIG. 4 is a block diagram illustrating a functional configuration example of image projection software installed in an information processing apparatus according to a first embodiment.

FIG. 4 is a block diagram illustrating a functional configuration example of image projection software installed in the information processing apparatus 1 according to a first embodiment. The image projection software includes a user interface part 101, an image projection apparatus searching part 102, a connection information list manager 103, an image projection apparatus connecting part 104, a communications controller 105, and a projection data creating part 106.

The user interface part 101 is configured to receive an input from a user, and transmits a report to the user. The input received by the user interface part 101 includes a searching request for the image projection apparatus 3, specifications of the image projection apparatus 3 to which the information processing apparatus 1 is connected, connection information used for connecting the information processing apparatus 1 to the image projection apparatus 3, and the like. The report transmitted by the user interface part 101 includes a detected result of the image projection apparatus 3, a displayed list of the image projection apparatuses 3 having the connection information, and the like.

The image projection apparatus searching part 102 is configured to search for the image projection apparatuses 3 connected to the network 2. The search conducted by the image projection apparatus searching part 102 includes searching for the image projection apparatuses 3 within the network 2 by broadcasting to communication apparatuses within an identical segment of the network. The search for the image projection apparatuses 3 may be conducted by using a communications protocol such as a simple network management protocol (SNMP), or a simple service discovery protocol (SDP).

Further, the image projection apparatus searching part 102 is configured to acquire connection information from the detected image projection apparatuses 3. The connection information may be acquired from each of the image projection apparatuses 3 by using a corresponding one of the communication protocols, or application programming interfaces (API).

Further, the image projection apparatus searching part 102 verifies whether the own information processing apparatus 1 is connectable to the corresponding image projection apparatus 3 using the connection information. Specifically, the image projection apparatus searching part 102 accesses (connects to) the image projection apparatus 3 using the IP address included in the connection information to acquire information, other than the IP address, capable of identifying the image projection apparatus 3 such as an image projection apparatus name. The image projection apparatus searching part 102 verifies whether the own information processing apparatus 1 is connectable to the image projection apparatus 3 using the connection information in accordance with a connection result with the image projection apparatus 3, and information capable of identifying the image projection apparatus 3 acquired from the image projection apparatus 3.

The verification of connectivity to the image projection apparatus 3 is determined based on a timing at which the image projection software starts, or a timing at which the image projection apparatus searching part 102 acquires the connection information from another information processing apparatus 1. Note that the timing at which the image projection apparatus searching part 102 conducts the verification of connectivity to the image projection apparatus 3 may be set by receiving an input from the user via the user interface part 101.

The connection information list manager 103 includes a list for recording the connection information, and is configured to register (record), update, and delete the connection information. The connection information list manager 103 is also configured to search the connected network for other information processing apparatuses 1 and acquire connection information lists from respective information processing apparatuses 1. The connection information list manager 103 refers to the connection information lists acquired from the respective information processing apparatuses 1 to update the connection information list of the own information processing apparatus 1.

Further, when the connection information list manager 103 receives a transmission request of the connection information list from other information processing apparatuses 1 over the connected network 2, the connection information list manager 103 transmits the connection information list to these information processing apparatuses 1.

The image projection apparatus connecting part 104 is configured to connect the information processing apparatus 1 to the image projection apparatus 3 on the network. The image projection apparatus connecting part 104 connects the (own) information processing apparatus 1 to the image projection apparatus 3 by acquiring the connection information of a corresponding one of the image projection apparatuses 3 from the connection information list manager 103.

The communications controller 105 is configured to transmit or receive data such as connection information or connection information lists. The transmission or reception of data may be conducted by using a predetermined protocol such as HTTP.

The projection data creating part 106 is configured to convert image data of images desired to be projected on a projection screen via the image projection apparatus 3 into a data format capable of being processed by the image projection apparatus 3.

In the following, an illustration is given of a data configuration of the connection information. FIG. 5 is a diagram illustrating a data configuration example of the connection information.

As illustrated in FIG. 5, the connection information includes items "IP address", "image projection apparatus name", "number of connection times", "final connection date and time", "constant use", "connection verification result", and "deletion determination result".

The "IP address" is information indicating the IP address assigned to the image projection apparatus 3. The "IP address" is at least set in the connection information. FIG. 5 illustrates an example of the "IP address" corresponding to IPv4; however, the "IP address" may correspond to IPv6. Further, FIG. 5 illustrates examples of IP addresses that are local addresses; however, the IP addresses may be global addresses.

The "image projection apparatus name" is information uniquely set for each of the image projection apparatuses 3.

The "number of connection times" is information indicating the number of times the information processing apparatus 1 has connected to the respective image projection apparatuses 3. The number of times that the own information processing apparatus 1 has connected to each of the image projection apparatuses 3 is stored in the "number of connection times". When the own information processing apparatus 1 has acquired the connection information list from another information processing apparatus 1 and adds new connection information to the connection information list of the own information processing apparatus 1, "0" is set for the "number of connection times". The "number of connection times" is updated every time the own information processing apparatus 1 connects to the image projection apparatus 3.

The "final connection date and time" is information indicating the final date and time that the own information processing apparatus 1 has connected to each of the image projection apparatuses 3. In the example illustrated in FIG. 5, the "final connection date and time" are recorded in the order of the year, month, day, and time, such as "2013/12/10 11:00".

The "constant use" is information indicating whether to constantly use the corresponding image projection apparatus 3 when the own information processing apparatus 1 is to use the image projection apparatus 3. In the item "constant use", "On" or "Off" is input by the user's operation. When the own information processing apparatus 1 constantly uses the corresponding image projection apparatus 3, "On" is set in the item "constant use" of the specified image projection apparatus 3. In FIG. 5, the image projection apparatus having the image projection apparatus name "PJ01" is set as the image projection apparatus 3 that is to be constantly used. Note that "On" indicating "constant use" will not be simultaneously set in two or more image projection apparatuses 3.

The "connection verification result" is information indicating connectivity to the image projection apparatus 3 specified by the "image projection apparatus name" using the IP address recorded in the item "IP address". The value set in the item "connection verification result" is determined based on the connection verification result determined by the image projection apparatus searching part 102. When the own information processing apparatus 1 is connectable to the image projection apparatus 3 specified by the "image projection apparatus name", "successful" is recorded in the item "connection verification result". When the own information processing apparatus 1 is not connectable to the image projection apparatus 3 specified by the "image projection apparatus name", "failed" is recorded in the item "connection verification result".

The "deletion determination result" is information indicating whether to delete the connection information from the connection information list. The value set in the item "deletion determination result" is determined based on a determination result of whether the own information processing apparatus 1 is connectable to the image projection apparatus 3 using the connection information. For example, when it is determined that the own information processing apparatus 1 is not connectable to the image projection apparatus 3 using the connection information, "delete" is set in the item "deletion determination result" due to the possibility that the corresponding (specified) image projection apparatus 3 does not exist on the network, or the connection information has been changed. The connection information having "delete" recorded in the item "deletion determination result" is deleted from the connection information list.

By contrast, when the own information processing apparatus 1 is capable of connecting to the image projection apparatus 3, "save" is recorded in the item "deletion determination result" due to the capability of connecting to the corresponding image projection apparatus 3 using the connection information included in the connection information list.

Note that "save" is set in the item "deletion determination result" of the image projection apparatus 3 having "On" set in the item "constant use" even when the own information processing apparatus 1 is not connectable to this image projection apparatus 3 using the connection information.

The connection information list may be displayed in the rearranged order in accordance with the items of the connection information.

FIG. 6 illustrates an example of the connection information list that is rearranged in an ascending order based on the item "number of connection times". In FIG. 6, the image projection apparatus name "PJ01" having the highest number of connection times "12" is listed on the top of the list, the image projection apparatus name "PJ02" having the second highest number of connection times "8" is listed subsequent to the image projection apparatus name "PJ01" on the list, the image projection apparatus name "PJ03" is listed subsequent to the image projection apparatus name "PJ02" on the list, and the image projection apparatus name "PJ04" is listed on the bottom of the list.

FIG. 7 illustrates an example of the connection information list that is rearranged in a descending order based on the item "final connection date and time". In FIG. 7, the image projection apparatus name "PJ03" having the final connection date and time "2013/10/01/09:30" indicating the longest period since the last connection is listed on the top of the list, the image projection apparatus name "PJ01" having the final connection date and time "2013/12/01/15:20" indicating the second longest period since the last connection is listed subsequent to the image projection apparatus name "PJ03" on the list, the image projection apparatus name "PJ02"

having the final connection date and time "2013/12/10/11:00" is listed subsequent to the image projection apparatus name "PJ01" on the list, and the image projection apparatus name "PJ04" having no connection record is listed on the bottom of the list.

Figure 8:
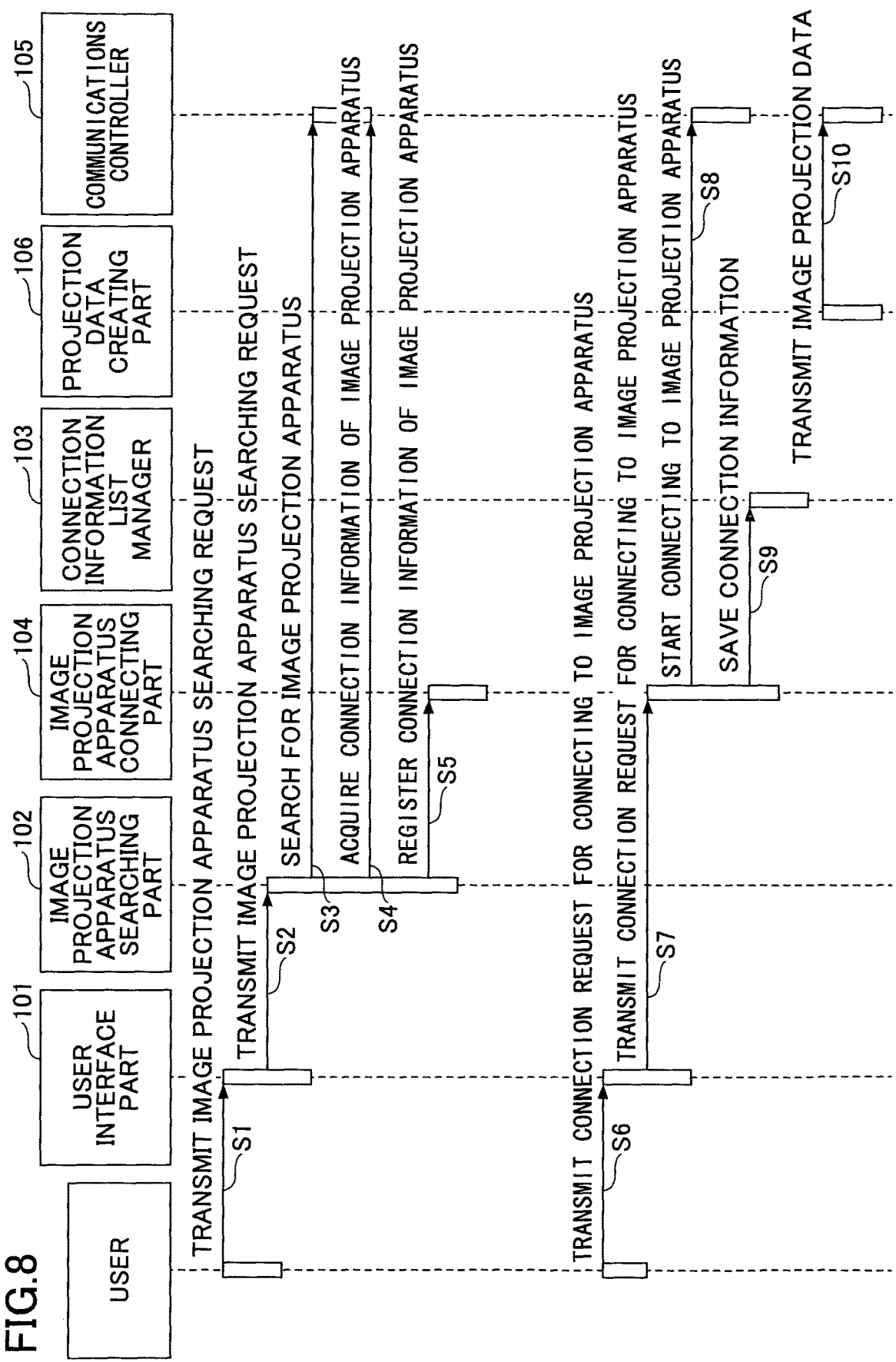
FIG. 8 is a sequence diagram illustrating a flow up to a time at which the information processing apparatus communicates with the image projection apparatus on the network.

FIG. 8 is a sequence diagram illustrating a process flow in which the information processing apparatus 1 searches the network for the image projection apparatuses 3 and connects to the detected image projection apparatus 3.

The user interface part 101 receives an image projection apparatus 3 searching request from a user (step S1). The user interface part 101 transmits the received search request to the image projection apparatus searching part 102 (step S2).

The image projection apparatus searching part 102 conducts the search for the image projection apparatuses 3 existing within the identical segment via the communications controller 105 (step S3). The search for the image projection apparatuses 3 may be conducted by broadcasting to the segment to which the information processing apparatus 1 belongs.

When the image projection apparatuses 3 are detected as a result of the conducted search for the image projection apparatuses 3, the image projection apparatus searching part 102 acquires connection information of the detected image projection apparatuses 3 such as the image projection apparatus name for each of the detected image projection apparatuses 3 (step S4). The image projection apparatus searching part 102 transmits the acquired connection information of the image projection apparatus 3 to the image projection apparatus connecting part 104, and the image projection apparatus connecting part 104 temporarily registers the connection information of the image projection apparatus 3 received from the image projection apparatus searching part 102 (step S5).

The user interface part 101 receives from the user specification of a desired one of the image projection apparatuses 3 to be connected from each of which the connection information is received (step S6). The user interface part 101 transmits to the image projection apparatus connecting part 104 a connection request for connecting to the image projection apparatus 3 specified by the user (step S7). The image projection apparatus connecting part 104 connects to the specified image projection apparatus 3 using the connection information of the temporarily registered image projection apparatus 3 (step S8).

When the image projection apparatus connecting part 104 has connected to the specified image projection apparatus 3, the image projection apparatus connecting part 104 transmits the connection information used for connecting to the image projection apparatus 3 to the connection information list manager 103, and the connection information list manager 103 adds the received connection information to the connection information list (step S9).

After the connection to the image projection apparatus 3 specified by the user has been established, the projection data creating part 106 transmits projection data to the image projection apparatus 3 (step S10).

Note that FIG. 8 illustrates an example in which the connection information of the image projection apparatus 3 is saved in the connection information list after the connection to the image projection apparatus 3 has been completed. However, the connection information of the image projection apparatus 3 may be saved in the connection information list at a time at which the connection information of the image projection apparatus 3 is acquired.

Figure 9:
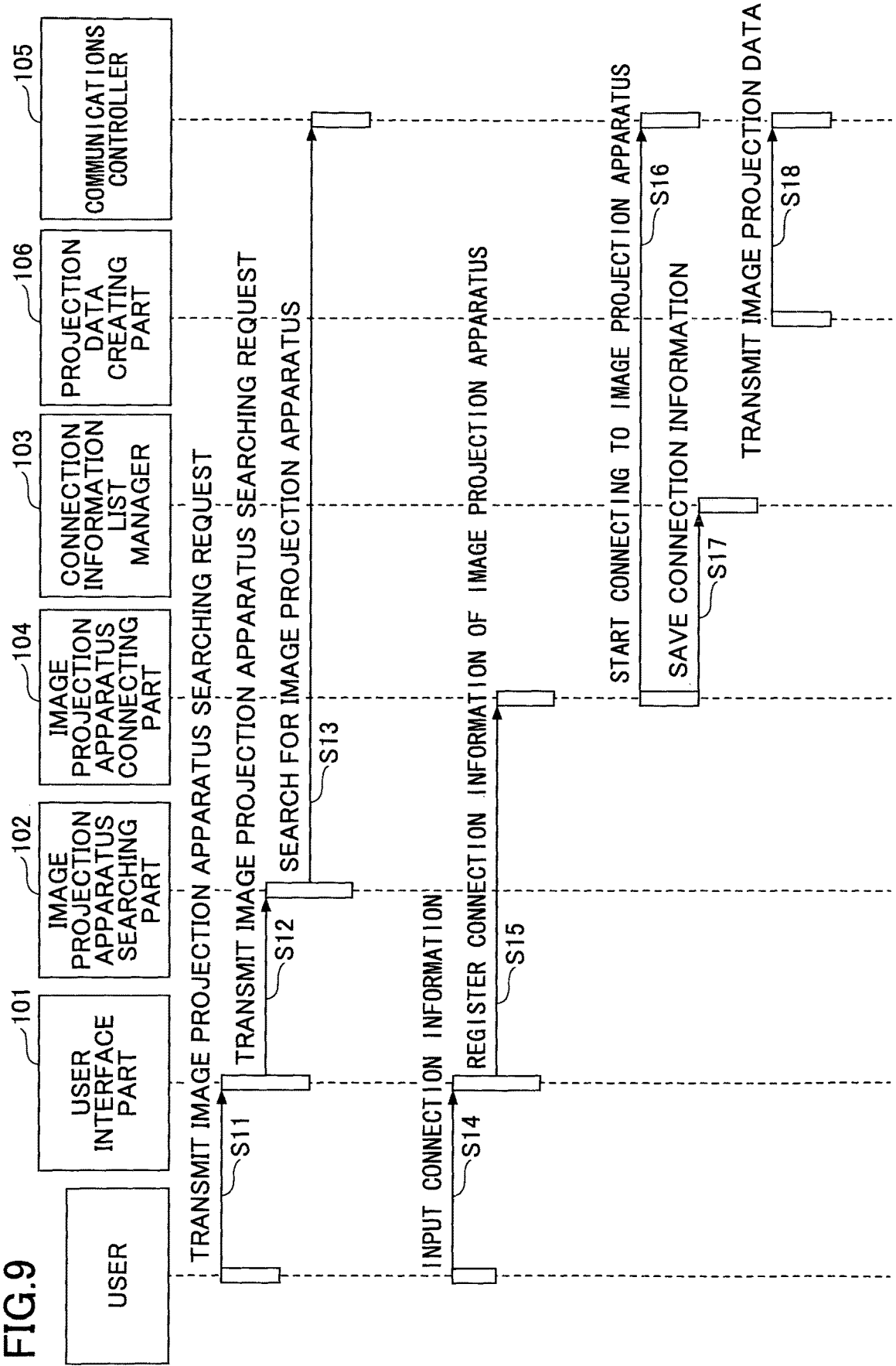
FIG. 9 is a sequence diagram illustrating a flow up to a time at which the information processing apparatus communicates with the image projection apparatus on the network.

FIG. 9 is a sequence diagram illustrating a process flow in which when the image projection apparatus searching part 102 fails to detect any of the image projection apparatuses 3, the connection to the image projection apparatus 3 is conducted by receiving the connection information from the user.

The image projection apparatus searching part 102 receives a searching request (i.e., an image projection apparatus searching request) from a user, and conducts the search for the image projection apparatuses 3 (step S11 to S13).

When the image projection apparatus searching part 102 fails to detect any of the image projection apparatuses 3, the user interface part 101 receives from the user an input of the connection information of the image projection apparatus to which the user intends to connect (step S14).

The user interface part 101 transmits the connection information received from the user to the image projection apparatus connecting part 104, and the image projection apparatus connecting part 104 temporarily registers the connection information received from the user interface part 101 (step S15). The image projection apparatus connecting part 104 makes the connection to the image projection apparatus 3 using the temporarily registered connection information (step S16).

When the image projection apparatus connecting part 104 has connected to the image projection apparatus 3, the image projection apparatus connecting part 104 transmits the connection information used for connecting to the image projection apparatus 3 to the connection information list manager 103, and the connection information list manager 103 adds the connection information received from the image projection apparatus connecting part 104 to the connection information list (step S17).

After the connection to the image projection apparatus 3 has been established, the projection data creating part 106 transmits projection data to the image projection apparatus 3 (step S18).

Note that FIG. 9 illustrates an example in which the input of the connection information is received from the user after the search is conducted by the image projection apparatus searching part 102. However, the input of the connection information may initially be received without the search conducted by the image projection apparatus searching part 102.

Figure 10:
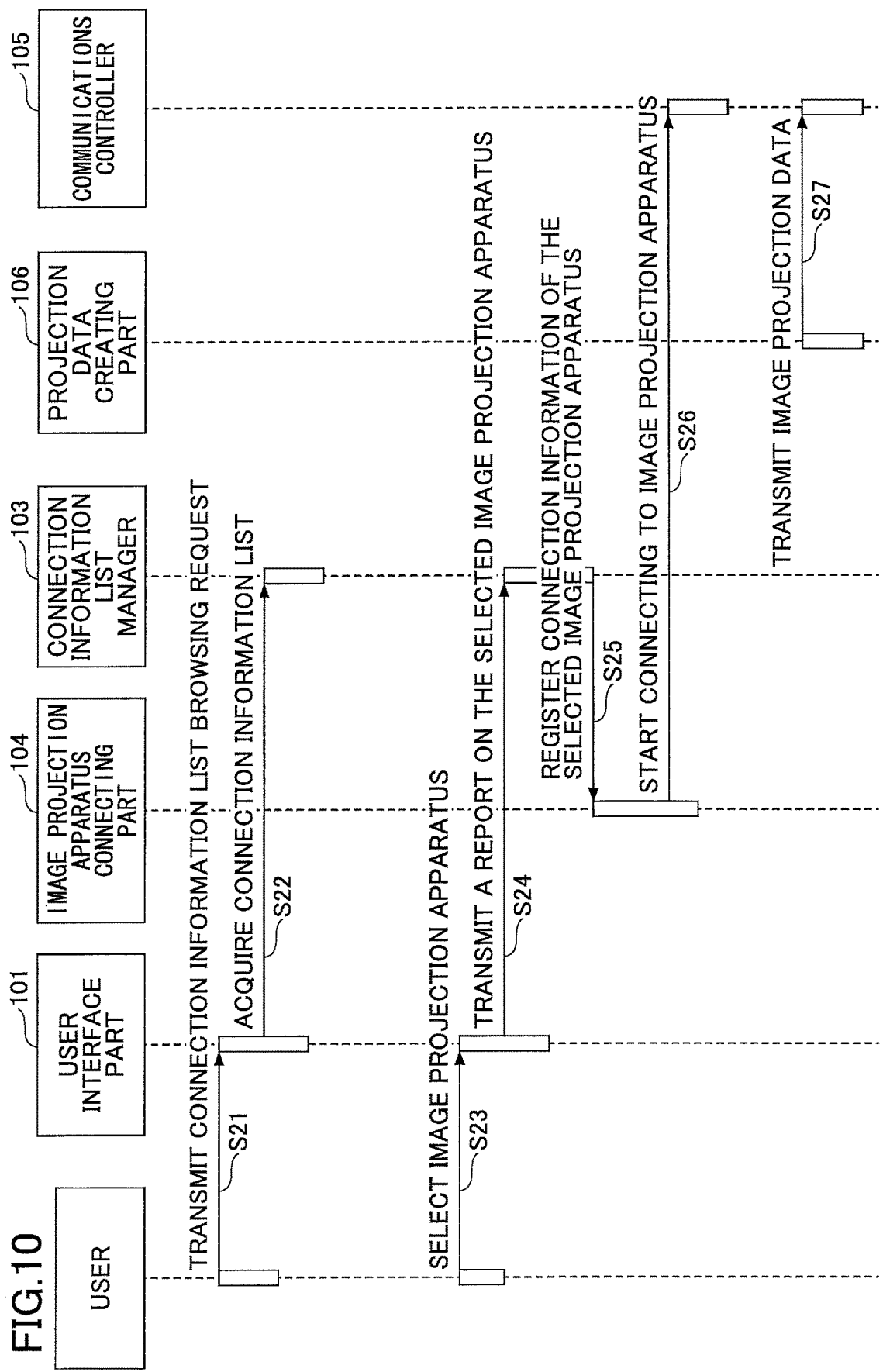
FIG. 10 is a sequence diagram illustrating a flow up to a time at which the information processing apparatus communicates with the image projection apparatus on the network using a connection information list.

FIG. 10 is a sequence diagram illustrating a flow up to a time at which the information processing apparatus 1 communicates with the image projection apparatus 3 on the network 2 using a connection information list.

The user interface part 101 receives a connection information list browsing request from a user (step S21). The user interface part 101 acquires the connection information list from the connection information list manager 103, and displays the acquired connection information list to the user (step S22).

The user selects one of the connection information sets of the image projection apparatus 3 from the connection information list (step S23). The user interface part 101 transmits a report indicating the connection information selected by the user to the connection information list manager 103 (step S24). The connection information list manager 103 that has received the report transmits the connection information of the selected image projection apparatus 3 to the image projection apparatus connecting part 104 (step S25).

The image projection apparatus connecting part 104 makes the connection to the image projection apparatus 3 selected by the user using the received connection information (step S26). After the connection to the image projection apparatus 3 has been established, the projection data creating part 106 transmits projection data to the image projection apparatus 3 (step S27).

Figure 11:
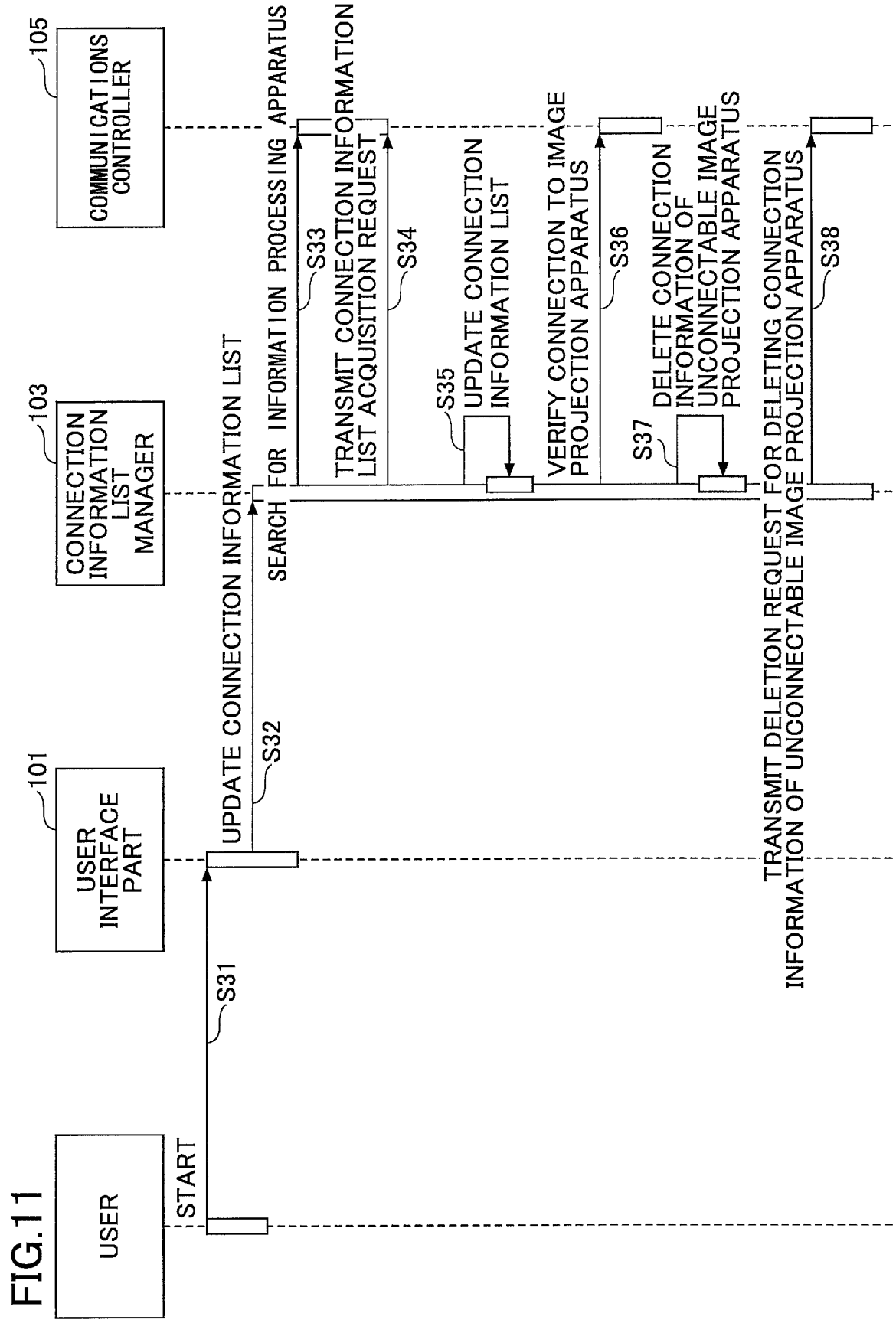
FIG. 11 is a sequence diagram illustrating a flow up to a time at which the information processing apparatus acquires the connection information list relating to the image projection apparatuses from another information processing apparatus, and updates its own connection information list.

FIG. 11 is a sequence diagram illustrating a process flow up to a time at which the information processing apparatus 1 connects to the image projection apparatus 3 using the connection information of the image projection apparatus 3 acquired from another information processing apparatus 1.

The user interface part 101 receives an image projection software execution request from a user (step S31).

The user interface part 101 transmits a connection information list update request to the connection information list manager 103 (step S32). The connection information list manager 103 that has received the connection information list update request searches for other information processing apparatuses 1 within the identical segment (step S33).

The connection information list manager 103 transmits to the detected information processing apparatuses 1 the connection information list transmission request for the connection information list held by the other information processing apparatuses 1, and acquires the connection information from the detected information processing apparatuses 1 (step S34).

The connection information list manager 103 refers to the connection information list acquired from the other information processing apparatuses 1 to update the stored connection information list (step S35). The connection information list is updated by adding connection information of the image projection apparatus 3 that is not recorded in the connection information list, or deleting the connection information of the image projection apparatus 3 having "delete" recorded in the item "deletion determination result".

After the connection information list has been updated, the connection information list manager 103 verifies whether the own information processing apparatus 1 is connectable to each of the image projection apparatuses 3 using the connection information of a corresponding one of the image projection apparatuses 3 (step S36). The connectivity to each of the image projection apparatuses 3 may be determined by connecting to the image projection apparatus 3 using the connection information, acquiring the image projection apparatus name from the image projection apparatus 3, and matching the image projection apparatus name included in the connection information and the acquired image projection apparatus name.

When there is an image projection apparatus 3 that is not connectable using the connection information in the list, the connection information list manager 103 updates the item "deletion determination result" and deletes the connection information of the corresponding image projection apparatus 3.

After the connection information list manager 103 deletes the connection information of the unconnectable image projection apparatus 3, the connection information list manager 103 transmits a request for deleting the connection information of the unconnectable image projection apparatus 3 from the connection information list (step S38).

Figure 12:
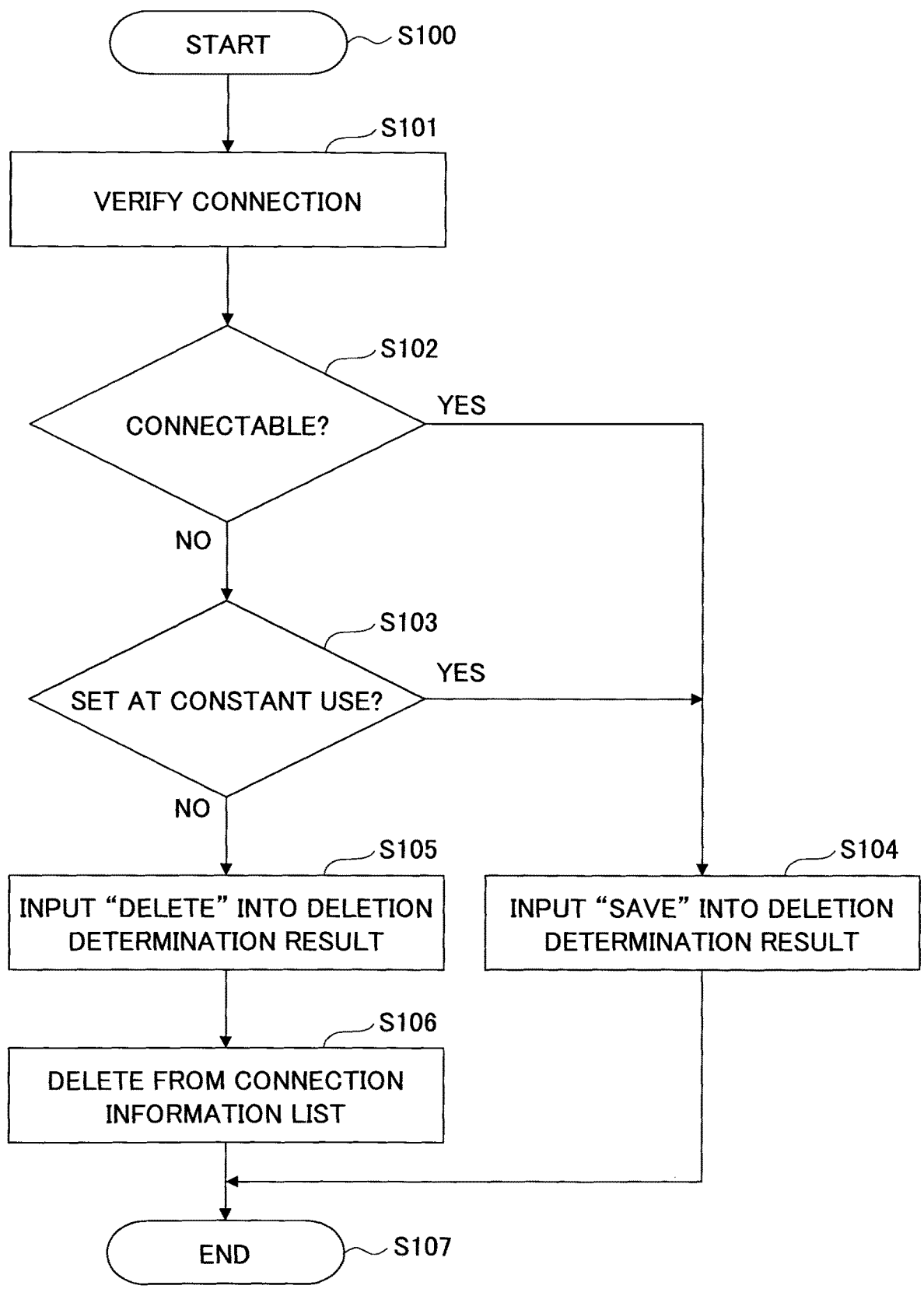
FIG. 12 is a flowchart illustrating a process in which the information processing apparatus deletes connection information of an unconnectable image projection apparatus from the connection information list.

FIG. 12 is a diagram illustrating an example of a process of deleting the connection information of the image projection apparatus 3 from the connection information list using the connection information.

As illustrated in FIG. 11, the deleting process starts after the connection information list manager 103 acquires the connection information list from other information processing apparatuses 1 and updates the connection information list (step S100).

The image projection apparatus searching part 102 verifies whether the information processing apparatus 1 is connectable to the corresponding image projection apparatus 3 using the connection information included in the connection information list (step S101).

The connection information list manager 103 determines whether the information processing apparatus 1 is connectable to the image projection apparatus 3 by using the connection information, based on the verification result acquired by the image projection apparatus searching part 102 (step S102).

When the information processing apparatus 1 is connectable to the image projection apparatus 3 by using the connection information (YES in step S102), "save" is set in the item "deletion determination result", and the process ends (steps S104, and S107).

When the information processing apparatus 1 is not connectable to the image projection apparatus 3 by using the connection information (NO in step S102), whether the constant use is set for the image projection apparatus 3 is determined; that is, whether "On" is set in the item "constant use" for the image projection apparatus 3 is determined (step S103).

When the constant use is set for the image projection apparatus 3 (YES in step S103), "save" is set in the item "deletion determination result", and the process ends (steps S104, and S107).

When the constant use is not set for the image projection apparatus 3 (NO in step S103), "delete" is set in the item "deletion determination result" (step S105). Subsequently, the connection information of the image projection apparatus 3 recording "delete" in the item "deletion determination result" is deleted from the connection information list, and the process ends (steps S106 and S107).

Figure 13:
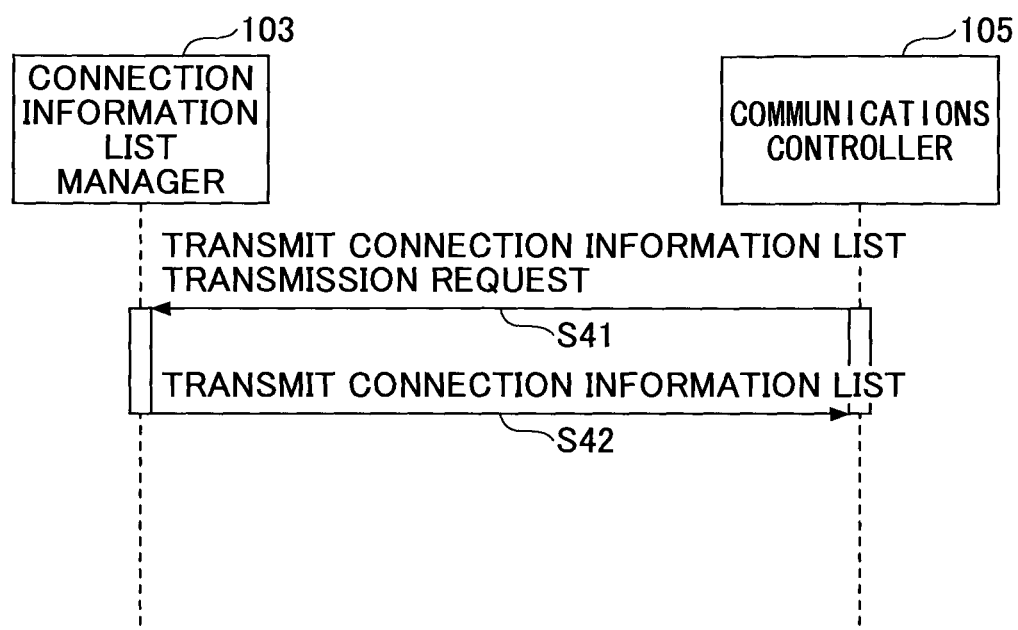
FIG. 13 is a sequence diagram illustrating a process in which the information processing apparatus transmits a connection information list of the image projection apparatuses to another information processing apparatus.

FIG. 13 is a diagram illustrating a process example when a connection information list transmission request is received from another information processing apparatus 1.

The communications controller 105 receives the connection information list transmission request from another information processing apparatus 1, and transmits the received connection information list transmission request to the connection information list manager 103 (step S41). The connection information list manager 103 transmits the connection information list to the other information processing apparatus 1 via the communications controller 105 (step S42).

First Modification of First Embodiment

The first modification of the first embodiment illustrates an example in which the connection information list is created and managed for each of the segments of the network2.

In the first modification of the first embodiment, the connection information list manager 103 saves and manages the connection information list for each of the segments of the network 2.

The connection information list manager 103 classifies the connection information in accordance with the IP address included in the connection information, and saves the connection information for each network 2.

FIGS. 14A and 14B illustrate examples of the connection information list for each of the segments of the network 2. FIG. 14A illustrates an example of the connection information list of the image projection apparatuses 3 existing in a network segment "192.168.11.x", whereas FIG. 14B illustrates an example of the connection information list of the image projection apparatuses 3 existing in a network segment "192.168.12.x".

When the connection information list manager 103 receives the connection information list transmission request from another information processing apparatus 1 over the identical network 2, the connection information list manager 103 transmits the connection information list of the segment to which the own information processing apparatus 1 is connected at a time at which the connection information list manager 103 receives the connection information list transmission request.

The process executed in the first modification of the first embodiment is identical to the process executed in the first embodiment except data configuration of the above-described connection information. Thus, duplicate illustration of the process illustrated using FIGS. 8 to 13 in the first embodiment is omitted from the specification.

Hence, when the information processing apparatus 1 desires to use only the image projection apparatus 3 connected to the network 2, the connection information of the image projection apparatuses 3 other than those connected to the network 2 are excluded, and the connection information of the image projection apparatuses 3 connected to the network 2 may be displayed.

Second Embodiment

A second embodiment illustrates an example in which the connection information includes a model name and version information. FIG. 15 is a block diagram illustrating a functional configuration example of an image projection apparatus 3 according to the second embodiment. In FIG. 15, functional components identical to those of FIG. 4 are provided with the same reference numbers. Further, an illustration of the functional components identical to those of FIG. 4 is omitted from the specification.

A connectable model storage part 111 is configured to store model information of the image projection apparatuses 3 to which the information processing apparatus 1 is connectable via the network.

FIG. 16 is a diagram illustrating a data configuration example of the model information of the connectable image projection apparatus 3 stored by the connectable model storage part 111.

The model information of the connectable image projection apparatus 3 includes items "connectable model" and "software version" in addition to the items illustrated in FIG. 5. The "connectable model" records a model of the image projection apparatus 3 such as "Type A". The "software version" records information indicating a version of the software such as "ver. 1.3 and later versions" with which the information processing apparatus 1 is connectable to the image projection apparatus 3. The information relating to the model of the connectable image projection apparatus 3 may be set by the user interface part 101 by receiving an input from the user.

The image projection apparatus searching part 102 acquires information about a model name and an installed software version of each of the image projection apparatuses 3 from a corresponding one of the detected image projection apparatuses 3.

FIG. 17 is a diagram illustrating a data configuration example of the connection information including model name information of the image projection apparatus 3, and information of software versions installed in the image projection apparatus 3. Note that an illustration of items identical to those of FIG. 5 is omitted from the specification.

The "model name" of the image projection apparatus 3 is information indicating a model name of the image projection apparatus 3. The software version information is information indicating a software version installed in the image projection apparatus 3. The "software version" is updated every time the information processing apparatus verifies the connectivity to the image projection apparatus 3.

As illustrated in FIG. 18, the connection information list manager 103 may only display the connection information of the connectable image projection apparatuses 3 by referring to the model information of the connectable image projection apparatus 3 stored in the connectable model storage part 111, and the model name and the software version of the image projection apparatus 3 included in the connection information.

The process executed in the first modification of the first embodiment is identical to the process executed in the first embodiment except the above-described functional configuration and data configuration of the connection information. Thus, a duplicated illustration of the process illustrated using FIGS. 8 to 13 in the first embodiment is omitted from the specification.

Accordingly, it may be possible to display the connectable image projection apparatuses 3 as well as preventing a connection error from occurring when the information processing apparatus 1 accidentally connects to the unconnectable image projection apparatus 3.

Third Embodiment

Figure 19:
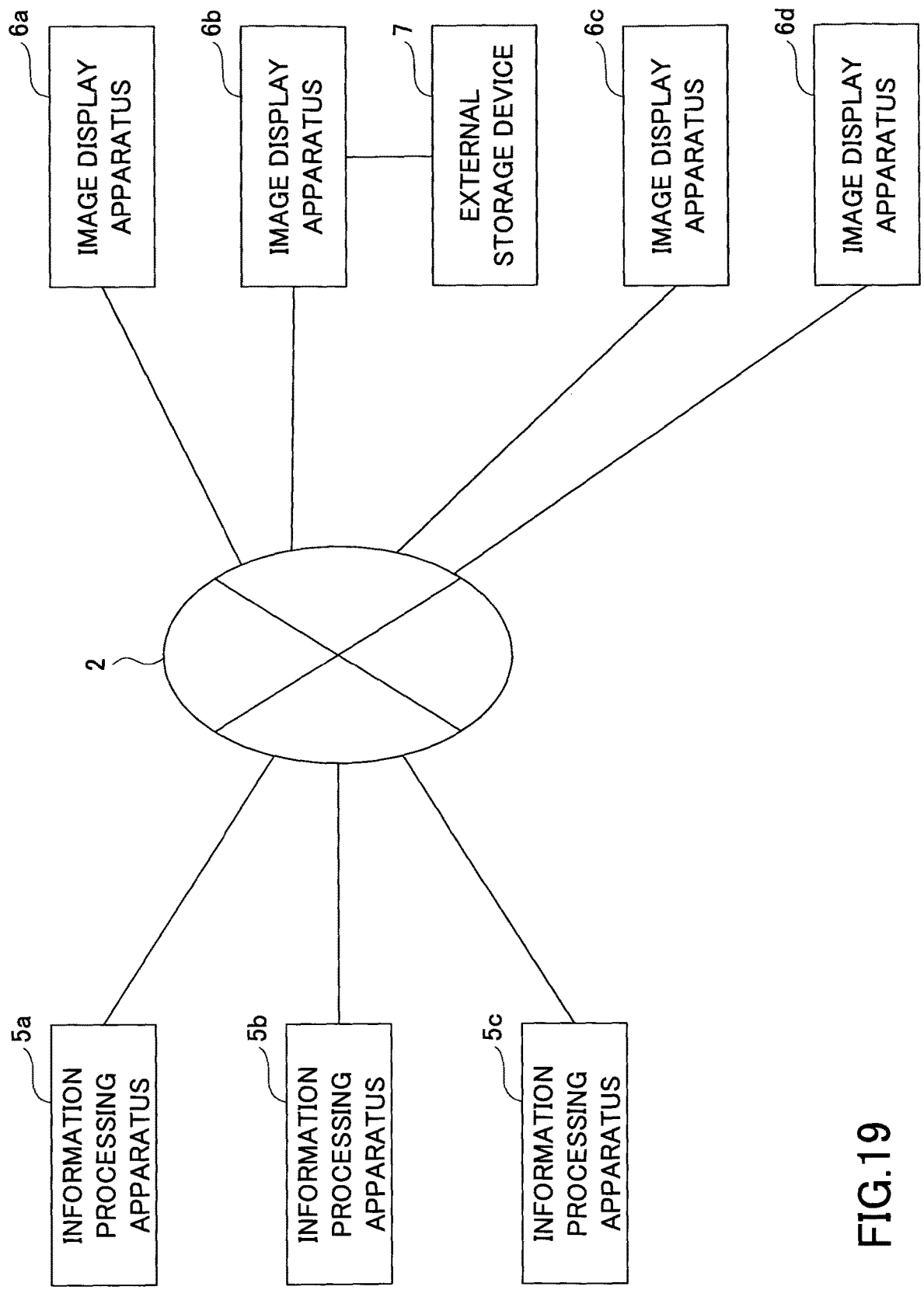
FIG. 19 is a diagram illustrating a configuration example of an image display system according to an embodiment.

FIG. 19 is a diagram illustrating an overall configuration of an image display system.

The image display system includes a personal computer (PC) connectable to the network 2, information processing apparatuses 5a to 5c such as tablet terminals, and image display apparatuses 6a to 6d. The information processing apparatuses 5a to 5c and the image display apparatuses 6a to 6d are connected with one another via the network 2.

The information processing apparatuses 5a to 5c have information processing apparatus software installed for connecting to the image display apparatus such as the image display apparatuses 6a to 6d and transmitting image information to the image display apparatus. The information processing apparatuses 5a to 5c may prepare image information such as capture data on a desktop screen, and transmit the image information to the image display apparatuses 6a to 6d via the network 2. The image display apparatuses 6a to 6d that have received the image information transmitted by the information processing apparatuses 5a to 5c may process the image information to display, images.

Further, external storage devices 7 such as a USB memory, a hard disk, a network attached storage (NAS), and the like may be connected to the image display apparatuses 6a to 6d. In such a case, the image display apparatuses 6a to 6 may open an image information file stored in the external storage device 7, and process the image information to display images.

Note that in the following illustration, an "information processing apparatus 5" represents any one of the information processing apparatuses (5a, 5b, and 5c), and an "image display apparatus 6" represents any one of the image display apparatuses (6a, 6b, 6c, and 6d).

FIG. 19 illustrates an example of the image display system including three information processing apparatuses 5; however, the image display system may only include one or two information processing apparatuses 5, or may include four or more information processing apparatuses 5. FIG. 19 illustrates an example of the image display system including four image display apparatuses 6; however, the image display system may only include one to three image display apparatuses 6, or may include five or more image display apparatuses 6.

Hardware Configuration

FIG. 2 may be applied to the hardware configuration of the information processing apparatus 5 of the image display system, and FIG. 3 may be applied to the hardware of the image display apparatus 6.

Functional Configuration of Image Display System Functional Configuration of Information Processing Apparatus 5

Figure 20:
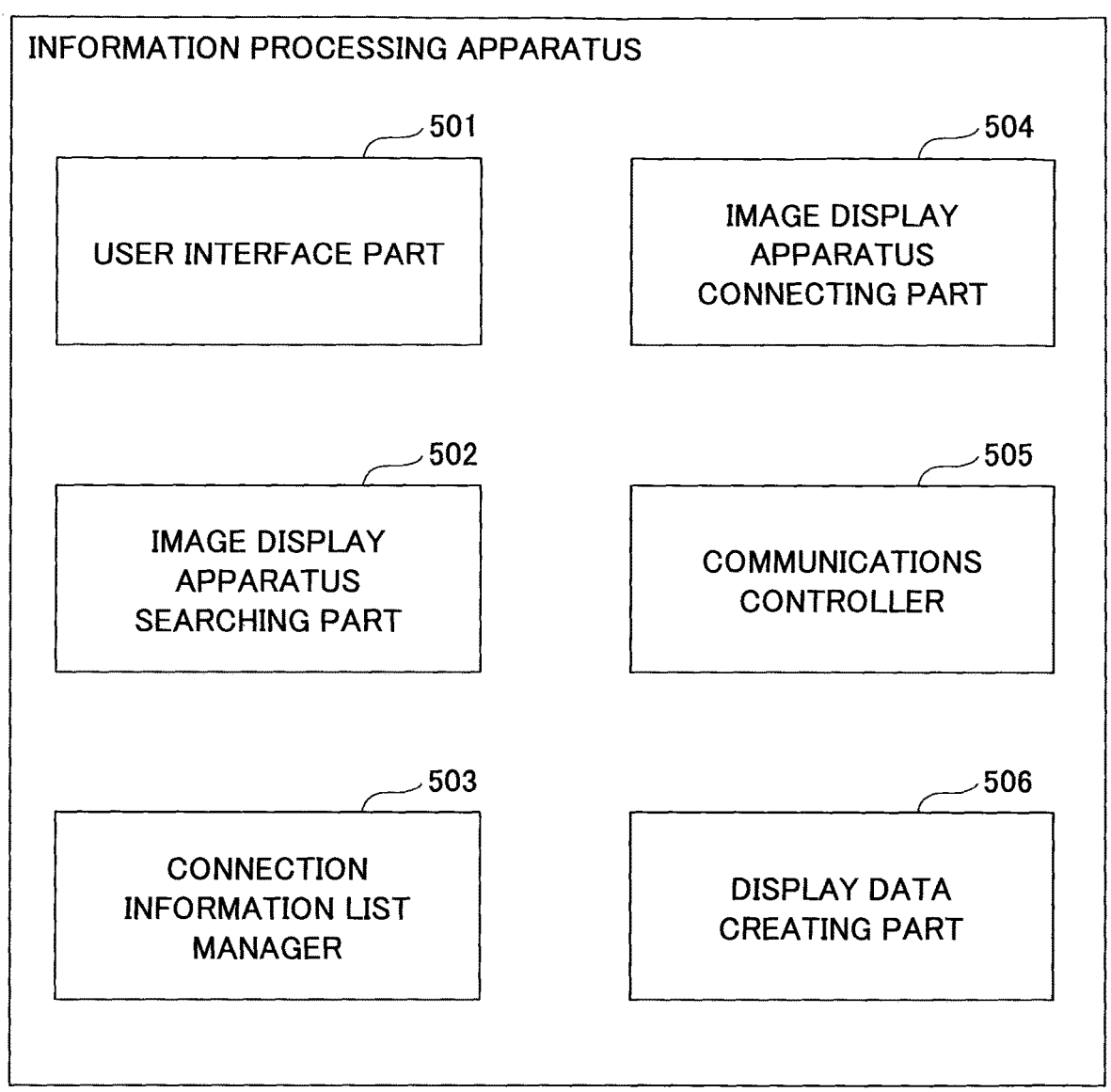
FIG. 20 is a block diagram illustrating a functional configuration example of software installed in an information processing apparatus according to a third embodiment.

FIG. 20 is a block diagram illustrating functional configuration example of information processing apparatus software installed in the information processing apparatus 5. The information processing apparatus software includes a user interface part 501, an image display apparatus searching part 502, a connection information list manager 503, an image display apparatus connecting part 504, a communications controller 505, and a display data creating part 506.

The user interface part 501 is configured to receive an input from a user, and transmits a report to the user. The input received by the user interface part 501 includes a searching request for the image display apparatus 6, specification of the image display apparatus 6 to which the information processing apparatus 5 is connected, input of connection information used for connecting the information processing apparatus 5 to the image display apparatus 6, and the like. The report transmitted by the user interface part 501 includes a detected result of the image display apparatus 6, a displayed list of the image display apparatuses 6 having the connection information, and the like.

The image display apparatus searching part 502 is configured to search for the image display apparatuses 6 connected to the network 2. The search conducted by the image display apparatus searching part 502 includes searching for the image display apparatuses 6 within the network by broadcasting to communication apparatuses within an identical segment of the network. The search for the image display apparatuses 6 may be conducted by using a communications protocol such as a simple network management protocol (SNMP), or a simple service discovery protocol (SDP).

Further, the image display apparatus searching part 502 is configured to acquire connection information from the detected image display apparatuses 6. The connection information may be acquired from each of the image display apparatuses 6 by using a corresponding one of the communication protocols, or application programming interfaces (API).

Further, the image display apparatus searching part 502 verifies whether the information processing apparatus 5 is connectable to the corresponding image display apparatus 6 using the connection information. Specifically, the image display apparatus searching part 502 accesses the image display apparatus 6 using the IP address included in the connection information to acquire information, other than the IP address, capable of identifying the image display apparatus 6 such as an image display apparatus name. The image display apparatus searching part 502 verifies whether the information processing apparatus 5 is connectable to the image display apparatus 6 using the connection information in accordance with a connection result with the image display apparatus 6, and information capable of identifying the image display apparatus 6 acquired from the image display apparatus 6.

The verification of connectivity to the image display apparatus 6 is determined based on a timing at which the image display software starts, or a timing at which the image display apparatus searching part 502 acquires the connection information from another information processing apparatus 5. Note that the timing at which the image display apparatus searching part 502 conducts the verification of connectivity with the image display apparatus 6 may be set by receiving an input from the user via the user interface part 501.

The connection information list manager 503 includes a list for recording the connection information, and is configured to register (record), update, and delete the connection information. The connection information list manager 503 is also configured to search the connected network 2 for other information processing apparatuses 5 and acquire connection information lists from respective information processing apparatuses 5. The connection information list manager 503 refers to the connection information lists acquired from the respective information processing apparatuses 5 to update the connection information list of the own information processing apparatus.

Further, when the connection information list manager 503 receives a transmission request of the connection information list from other information processing apparatuses 5 over the connected network 2, the connection information list manager 503 transmits the connection information list to these information processing apparatuses 5.

The image display apparatus connecting part 504 is configured to connect the information processing apparatus 5 to the image display apparatus 6 on the network 2. The image display apparatus connecting part 504 connects the (own) information processing apparatus 5 to the image display apparatus 6 by acquiring the connection information of a corresponding one of the image display apparatuses 6 from the connection information list manager 503.

The communications controller 505 is configured to transmit or receive data such as connection information or connection information lists. The transmission or reception of data may be conducted by using a predetermined protocol such as HTTP.

The display data creating part 506 is configured to convert image data of an image desired to be projected on a projection screen via the image display apparatus 6 into a data format capable of being processed by the image display apparatus 6.

The already described above embodiments may be applied for illustrating the connection information list and operations of the system.

Functional Configuration of Image Display Apparatus 6

Figure 21:
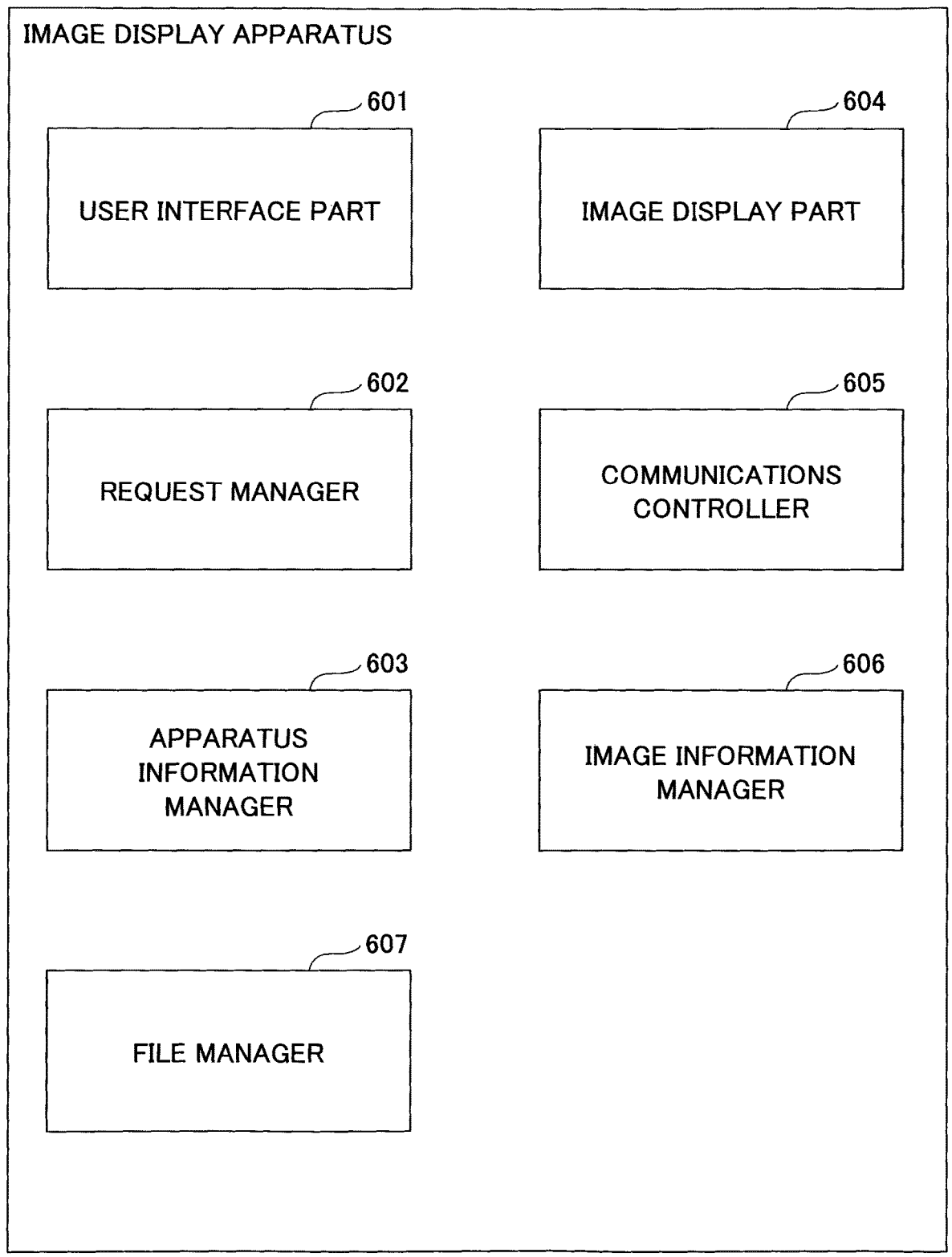
FIG. 21 is a block diagram illustrating a functional configuration example of software installed in an image display apparatus according to the third embodiment.

FIG. 21 is a functional block diagram illustrating a functional configuration example of image display apparatus software installed in the image display apparatus 6. The image display apparatus software includes a user interface part 601, a request manager 602, an apparatus information manager 603, an image display part 604, a communications controller 605, an image information manager 606, and a file manager 607.

The user interface part 601 is configured to receive an input from a user, and transmits a report to the user. The user may input information to the user interface part 601 via hardware such as a button. The user interface part 601 display-controls a light emitting diode (LED) as well as conducting display control of a UI component.

The request manager 602 is configured to receive and execute various types of requests transmitted from the user interface part 601 or the information processing apparatus 5 via the network 2.

The apparatus information manager 603 is configured to manage a status or setting information of the image display apparatus 6.

The image display part 604 is configured to display images.

The communications controller 605 is configured to transmit and receive various types of requests or image information via the network 2.

The image information manager 606 is configured to manage image information as well as applying various types of processes to images.

the file manager 607 is configured to read files such as images stored in the external storage device 7, or write files such as images into the external storage device 7 when the external storage device 7 is connected.

Operations of Image Display System

Figure 22:
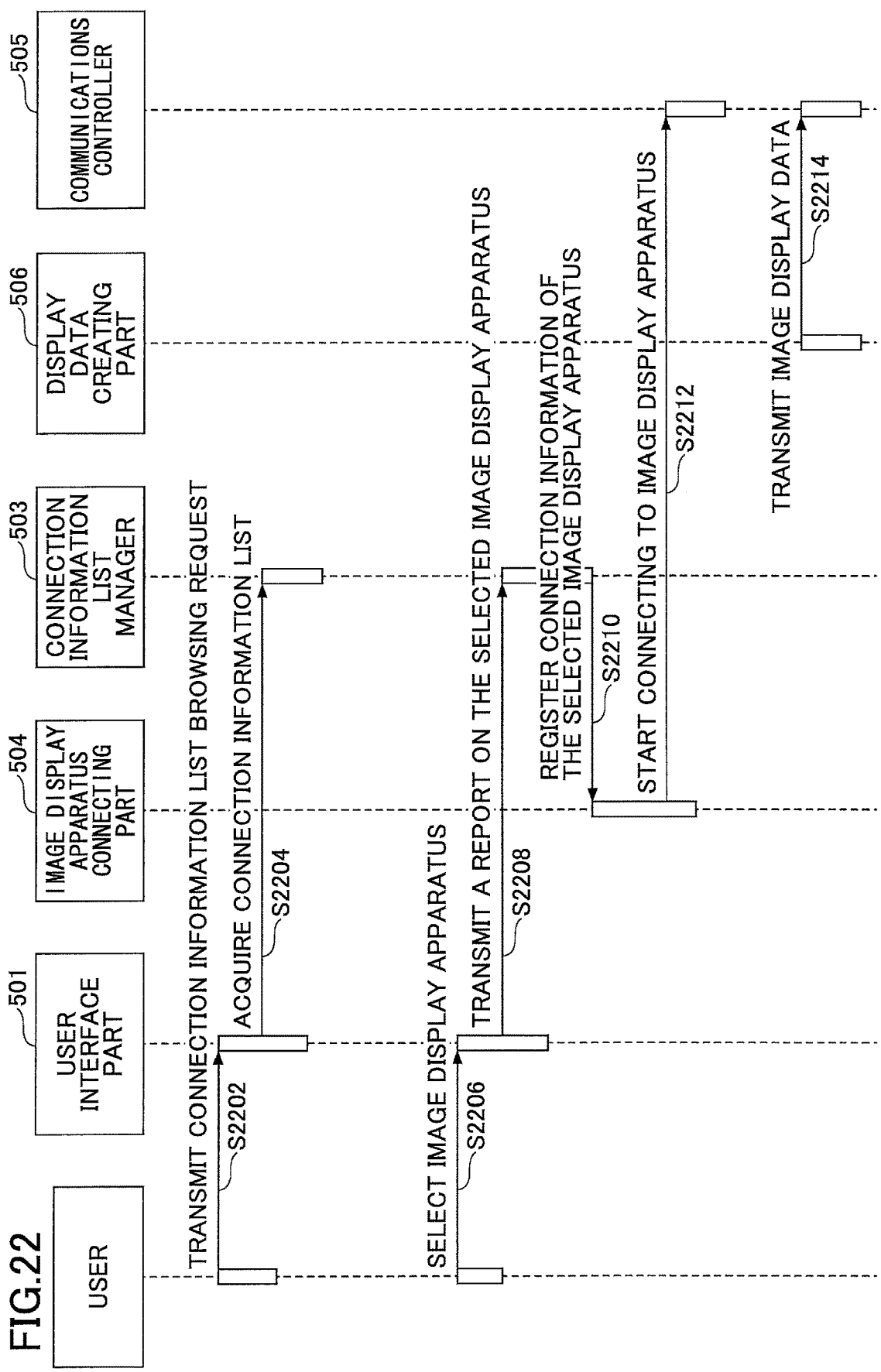
FIG. 22 is a sequence diagram illustrating an example (1) of operations of the image display system.

FIG. 22 illustrates an example (1) of operations of the image display system.

In the example illustrated in FIG. 22, the information processing apparatus 5 connects to the image display apparatus 6 on the network 2 using a connection information list by causing a CPU 11 to operate in accordance with information processing apparatus software.

The user interface part 501 receives a connection information list browsing request from a user (step S2202). The user interface part 501 acquires the connection information list from the connection information list manager 503, and displays the acquired connection information list (step S2204).

The user selects the connection information of one of the image display apparatuses 6 from the connection information list (step S2206). The user interface part 501 transmits a report indicating the connection information selected by the user to the connection information list manager 503 (step S2208). The connection information list manager 503 that has received the report transmits the connection information of the selected image display apparatus 6 to the image display apparatus connecting part 504 (step S2210).

The image display apparatus connecting part connects to the image display apparatus 6 selected by the user using the received connection information (step S2212). After the connection to the image display apparatus 6 has been established, the display data creating part 506 transmits display data to the image display apparatus 6 (step S2214).

FIG. 23 illustrates an example (2) of operations of the image display system.

FIG. 23 illustrates an example in which the information processing apparatus 5 acquires image information from the image display apparatus 6 to display the acquired image information as a detected result (search result) after the operations in step S2212 illustrated in FIG. 22 by causing the CPU 11 to operate in accordance with the information processing apparatus software. The user may be able to browse the detected result to select a desired one of the image display apparatuses 6 for displaying the images of the information processing apparatus 5. The information processing apparatus 5 then connects to the image display apparatus 6 selected by the user.

After connecting to the image display apparatus 6, the image display apparatus searching part 502 of the information processing apparatus 5 inputs an image information acquisition request to acquire the image information to the communications controller 505 (step S2302). The image information acquisition request includes information about an image size to be acquired.

FIGS. 24A and 24B are diagrams illustrating an example of a data structure of the image information acquisition request.

The image information acquisition request includes settable items "reduction requirement" and "required image size". The "reduction requirement" indicates a setting of whether the image reduction is required or not required. The "required image size" indicates a setting of the image size required. As illustrated in FIG. 24A, when the item "reduction requirement" is set as "required", the item "required image size" may be set. The image display apparatus 6 that has received the image information acquisition request having the setting item "reduction requirement" being "required" transmits a response with, the image processed to have a size falling within the specified size while maintaining the size or the aspect ratio of the specified image. As illustrated in FIG. 24B, when the item "reduction requirement" is set as "unrequired", the setting of the item "required image size" is not required.

The subsequent illustration is given below by referring back to FIG. 23. The communications controller 505 transmits the image information acquisition request input by the image display apparatus searching part 502 to the image display apparatus 6 (step S2304).

The image information acquisition request transmitted by the information processing apparatus 5 is input into the communications controller 605 of the image display apparatus 6. The communications controller 605 inputs the image information acquisition request into the request manager 602 (step S2306).

The request manager 602 receives the image information acquisition request input by the communications controller 605, and acquires image information managed by the image information manager 606 (step S2308). The request manager 602 changes the size of the image in accordance with information about the image size included in the image information acquisition request (step S2310). For example, the request manager 602 may reduce or enlarge the size of the image in accordance with information about the image size. When the image information acquisition request includes a setting requiring an image process for an image such as a defocusing process or a mosaic process, the request manager 602 may also perform the image process as well as changing the size of the image (step S2312). The application of the image process such as the defocusing process or the mosaic process to the image may provide some advantageous effect. That is, the shape or color of the image may be roughly perceived or acknowledged; however, detailed information such as characters or letters are not readable. Hence, confidentiality of the image may be improved. The request manager 602 inputs an image information acquisition response accompanied by image information and additional information into the communications controller 605 (step S2314).

FIG. 25 is a diagram illustrating an example of additional information. The additional information includes acquired image information such as an "image display status", an "image acquisition capability setting", an "interruption connection capability setting", an "image transmission source user name", an "image file name", an "image", and the like. The "image display status" is information indicating whether an image is being displayed by the image display apparatus 6. The "image acquisition capability setting" is information indicating whether the information processing apparatus 5 is capable of acquiring an image displayed by the image display apparatus 6. The "interruption connection capability setting" is information indicating whether another information processing apparatus 5 is capable of connecting to the image display apparatus 6 by interrupting the connection between the information processing apparatus 5 connected to the image display apparatus 6. The "image transmission source user name" is information indicating a user name of the information processing apparatus 5 that transmits the image displayed by the image display apparatus 6. The "image file name" is information indicating a file name of image information that is displayed by processing the image information stored by the image display apparatus 6 in the external storage device 7. The "image" is information indicating a type of an image such as video, a static image, and the like.

As illustrated in FIG. 25A, when the "image display status" is "display", and the "image acquisition capability setting" is "capable", the image information acquisition response includes image information of the displayed image as well as the additional information.

As illustrated in FIG. 25B, when the "image display status" is "non-display", and the "image acquisition capability setting" is "incapable"; or as illustrated in FIG. 25C, when the "image display status" is "display", and the "image acquisition capability setting" is "incapable", the image information acquisition response does not include image information.

Further, when the "image display status" is "display", and the "interruption connection capability setting" is "capable", the image display apparatus 6 may be able to receive an image information acquisition request from another information processing apparatus 5 without awaiting termination of the image currently displayed by the image display apparatus 6.

When the "image display status" is "display", and the "interruption connection capability setting" is "incapable", the image display apparatus 6 is not allowed to receive an image information acquisition request from another information processing apparatus 5 without the termination of the image currently displayed by the image display apparatus 6.

Further, when the currently displayed image is transmitted by the information processing apparatus 5, a value is input in the "image transmission source user name", and when the currently displayed image is read from the external storage device 7, a value is input in the "image file name" as illustrated in FIG. 25D.

The subsequent illustration is given below by referring back to FIG. 23. The communications controller 605 transmits the image information acquisition response input by the request manager 602 to the information processing apparatus 5 (step S2316).

The image information acquisition response transmitted by the image display apparatus 6 is input into the communications controller 505 of the information processing apparatus 5. The communications controller 505 inputs the image information acquisition response into the image display apparatus searching part 502 (step S2318). When the image display apparatus searching part 502 receives the image information acquisition response input by the communications controller 505, the image display apparatus searching part 502 transmits a search end report to the user interface part 501 (step S2320). When the user interface part 501 receives the search end report input by the image display apparatus searching part 502, the user interface part 501 updates a display status of the image display apparatus list (step S2322).

Figure 26:
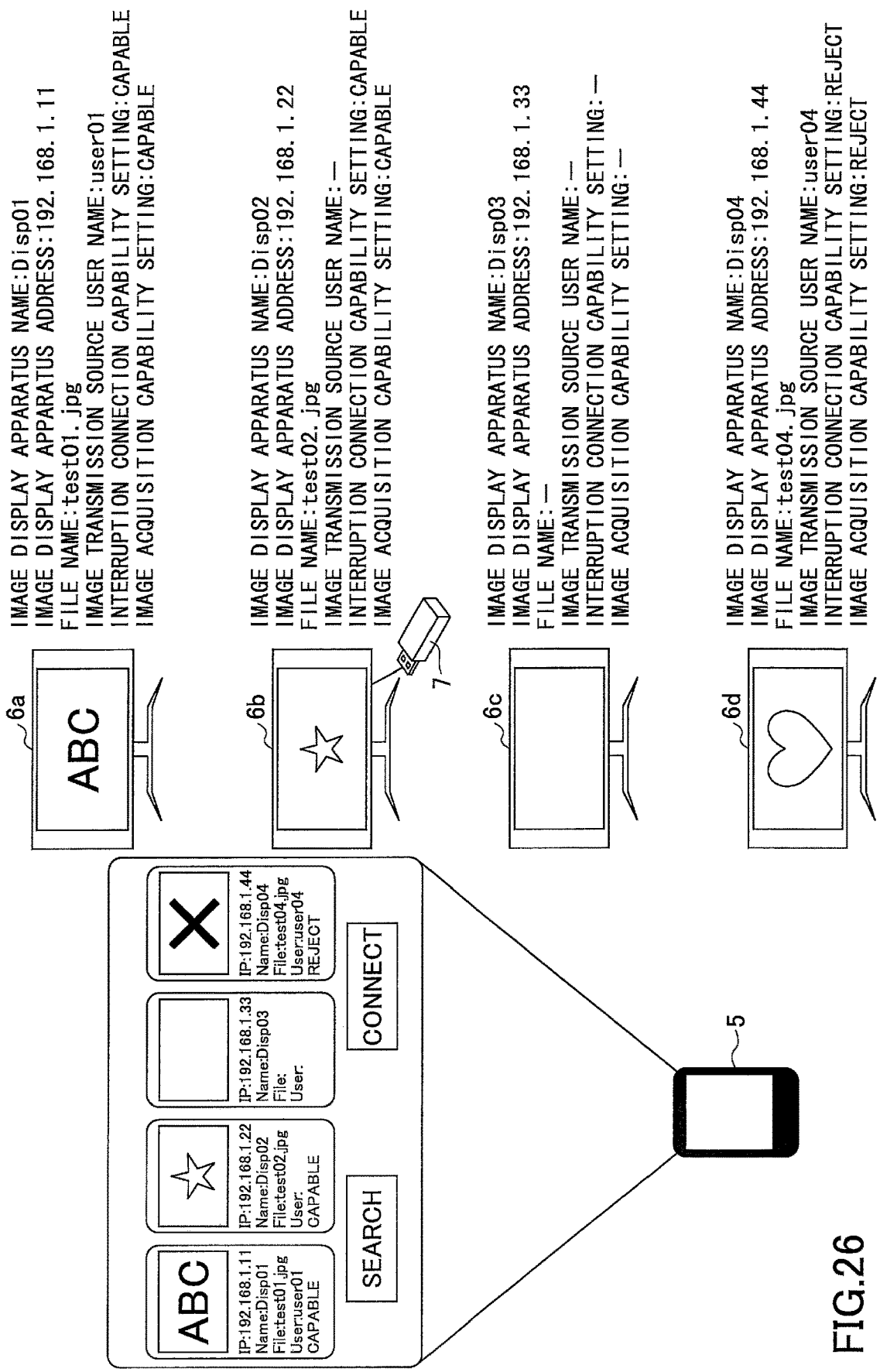
FIG. 26 is a diagram illustrating examples of an image display apparatus list displayed on a screen of the information processing apparatus.

FIG. 26 is a diagram illustrating examples of an image display apparatus list displayed on a screen of the information processing apparatus 5. The screen of a display device 15 of the information processing apparatus 5 displays images of the image display apparatuses 6 each to fall within a corresponding one of the display areas prepared, based on the image information acquisition responses acquired from the image display apparatuses 6.

When the information processing apparatus 5 conducts a search for the image display apparatus 6, identification information such as the IP address, the image display apparatus name, and the like is transmitted from each of the image display apparatuses 6 detected on the network. The information processing apparatus 5 displays the identification information transmitted by the image display apparatuses 6 as a detected result (search result).

In the example illustrated in FIG. 26, an image and the like are displayed on the screen by processing image information acquired from the image display apparatus 6a, and an image and the like are displayed on the screen by processing image information acquired from the image display apparatus 6b. Note that since the image display apparatus 6b displays an image of a file stored in the external storage device 7, the image transmission source user name is not displayed. Further, since the image display apparatus 6c is in a non-display status, only the image display apparatus address is displayed. Since the image display apparatus 6d includes the "image acquisition capability setting" being "reject", an image is not displayed.

The "search" button displayed on the screen of the display device 15 of the information processing apparatus 5 is used when the user starts searching for the image display apparatuses 6. Further, the process in step S2206 illustrated in FIG. 22 may also be started by depressing the "search" button. When the "search" button is depressed, a screen to prompt the user to input the image size may also be displayed.

The "connect" button may be depressed when the content is transmitted to the image display apparatus 6. When the "search" button is depressed, a screen to prompt the user to input the selection of the content, the image acquisition capability setting, and the interruption connection capability setting may also be displayed.

The subsequent illustration is given below by referring back to FIG. 23. The user may be able to browse the display apparatus list to select a desired one of the image display apparatuses 6 (step S2324). Further, the user may be able to depress the "connect" button to transmit the connection request for transmitting the image to the selected image display apparatus 6 (step S2326). When the "connect" button is depressed by the user, the user interface part 501 inputs the image transmission request into the image display apparatus connecting part 504 (step S2328). When the image display apparatus connecting part 504 receives the image transmission request input from the user interface part 501, the image display apparatus connecting part 504 acquires image information from the display data creating part 506 (step S2330).

The image display apparatus connecting part 504 inputs the image transmission request into the communications controller 505 (step S2332). The communications controller 505 transmits the image transmission request to the image display apparatus 6 (step S2334).

The image transmission request transmitted by the information processing apparatus 5 is input into the communications controller 605 of the image display apparatus 6. The communications controller 605 inputs the image transmission request into the request manager 602 (step S2336). When the request manager 602 receives the image transmission request input by the communications controller 605, the request manager 602 transmits an image display request to the image information manager 606 (step S2338). The image information manager 606 inputs image information into the image display part 604 in accordance with the image display request input by the request manager 602 (step S2340).

Figure 27:
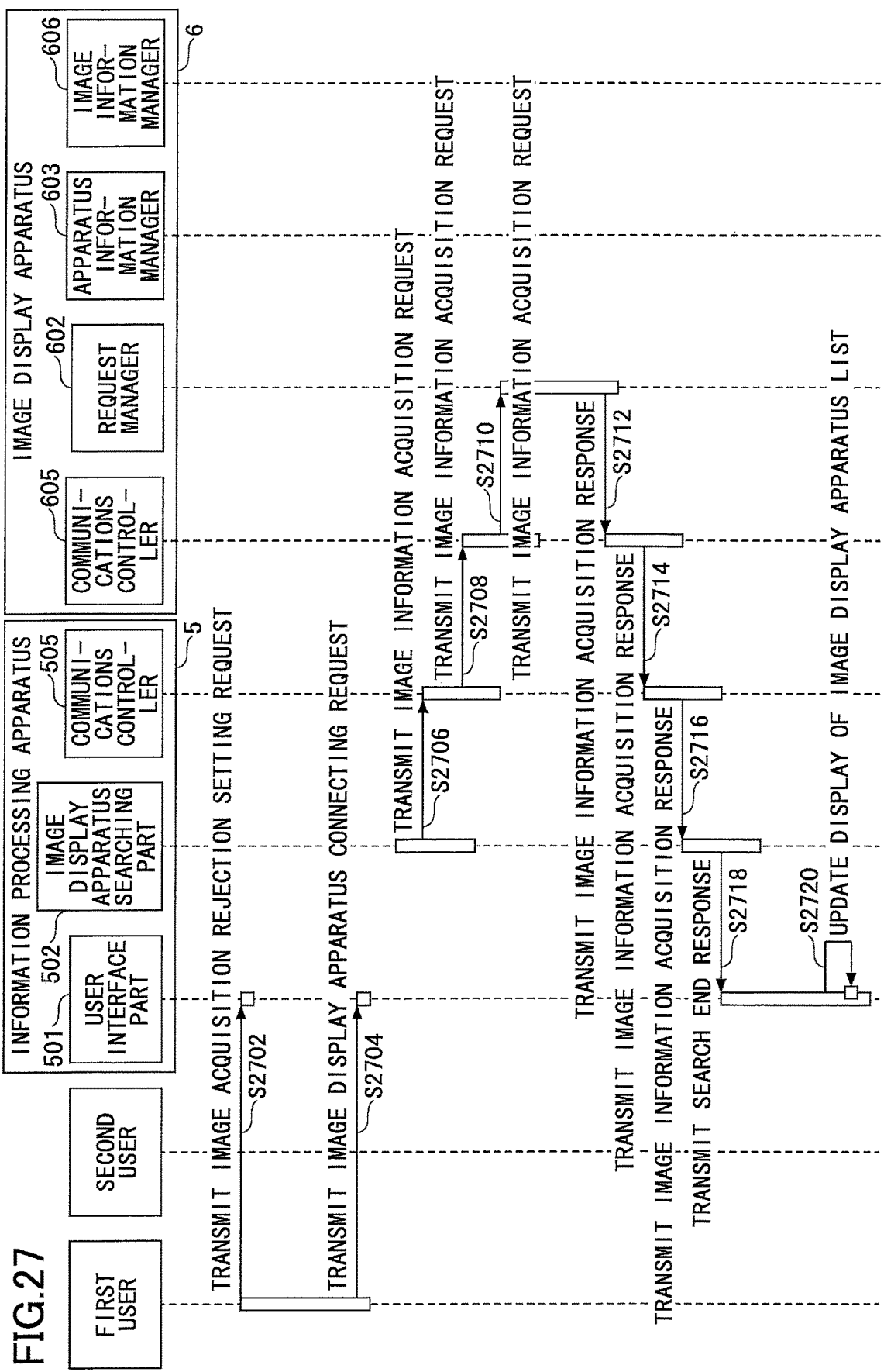
FIG. 27 is a sequence diagram illustrating an example (3) of operations of the image display system.

FIG. 27 illustrates an example (3) of operations of the image display system.

In the example illustrated in FIG. 27, the image display apparatus 6 displays an image for which the acquisition of image information is set to be rejected. Hence, when the image information acquisition request for requesting to display the image displayed by the corresponding image display apparatus 6 is transmitted from another information processing apparatus 5 other than the information processing apparatus 5 that transmits the image to the image display apparatus 6, the other information processing apparatus is unable to acquire the image information.

In FIG. 27, a first user corresponds to a user of the information processing apparatus 5 that transmits an image for which the acquisition of image information is set to be rejected. A second user corresponds to a user who conducts a search for the image display apparatuses 6. FIG. 27 illustrates only one information processing apparatus 5; however, the information processing apparatus 5 used by the first user differs from the information processing apparatus 5 used by the second user.

The user interface part 501 receives an image acquisition rejection setting request from the first user (step S2702). After receiving the image acquisition rejection setting request from the first user, the user interface part 501 receives a display apparatus connecting request from the first user (step S2704).

Steps S2208 to S2214 illustrated in FIG. 22 may be applied to steps subsequent step S2704. Note that in step S2214, the communications controller 505 of the first user's information processing apparatus 5 transmits the image display data together with the image acquisition rejection setting request to the image display apparatus 6. The image display data and the image acquisition rejection setting request transmitted by the first user's information processing apparatus 5 are input into the request manager 602. The request manager 602 manages the image display data so as not to be acquired.

After the second user's information processing apparatus 5 connects to the image display apparatus 6, the image display apparatus searching part 502 inputs the image information acquisition request into the communications controller 505 (step S2706). The image information acquisition request includes information about an image size to be acquired.

The communications controller 505 transmits the image information acquisition request input by the image display apparatus searching part 502 to the image display apparatus 6 (step S2708).

The image information acquisition request transmitted by the information processing apparatus 5 is input into the communications controller 605 of the image display apparatus 6. The communications controller 605 inputs the image information acquisition request into the request manager 602 (step S2710).

The request manager 602 receives the image information acquisition request input by the communications controller 605. Note that since the image information requested by the second user's information processing apparatus 5 corresponds to the image information of an image to which the acquisition of image information is set to be rejected, the second user's information processing apparatus 5 will not be provided with the requested image information.

The request manager 602 inputs an image information acquisition response accompanied by additional information into the communications controller 605 (step S2712).

The communications controller 605 transmits the image information acquisition response input by the request manager 602 to the second user's information processing apparatus 5 (step S2714).

The image information acquisition response transmitted by the image display apparatus 6 is input into the communications controller 505 of the second user's information processing apparatus 5. The communications controller 505 inputs the image information acquisition response into the image display apparatus searching part 502 (step S2716). When the image display apparatus searching part 502 receives the image information acquisition response input by the communications controller 505, the image display apparatus searching part 502 transmits a search end report to the user interface part 501 (step S2718). When the user interface part 501 receives the search end report input by the image display apparatus searching part 502, the user interface part 501 updates a display of the image display apparatus list (step S2720). The image display apparatus list displays identification information, and does not display image information.

Figure 28:
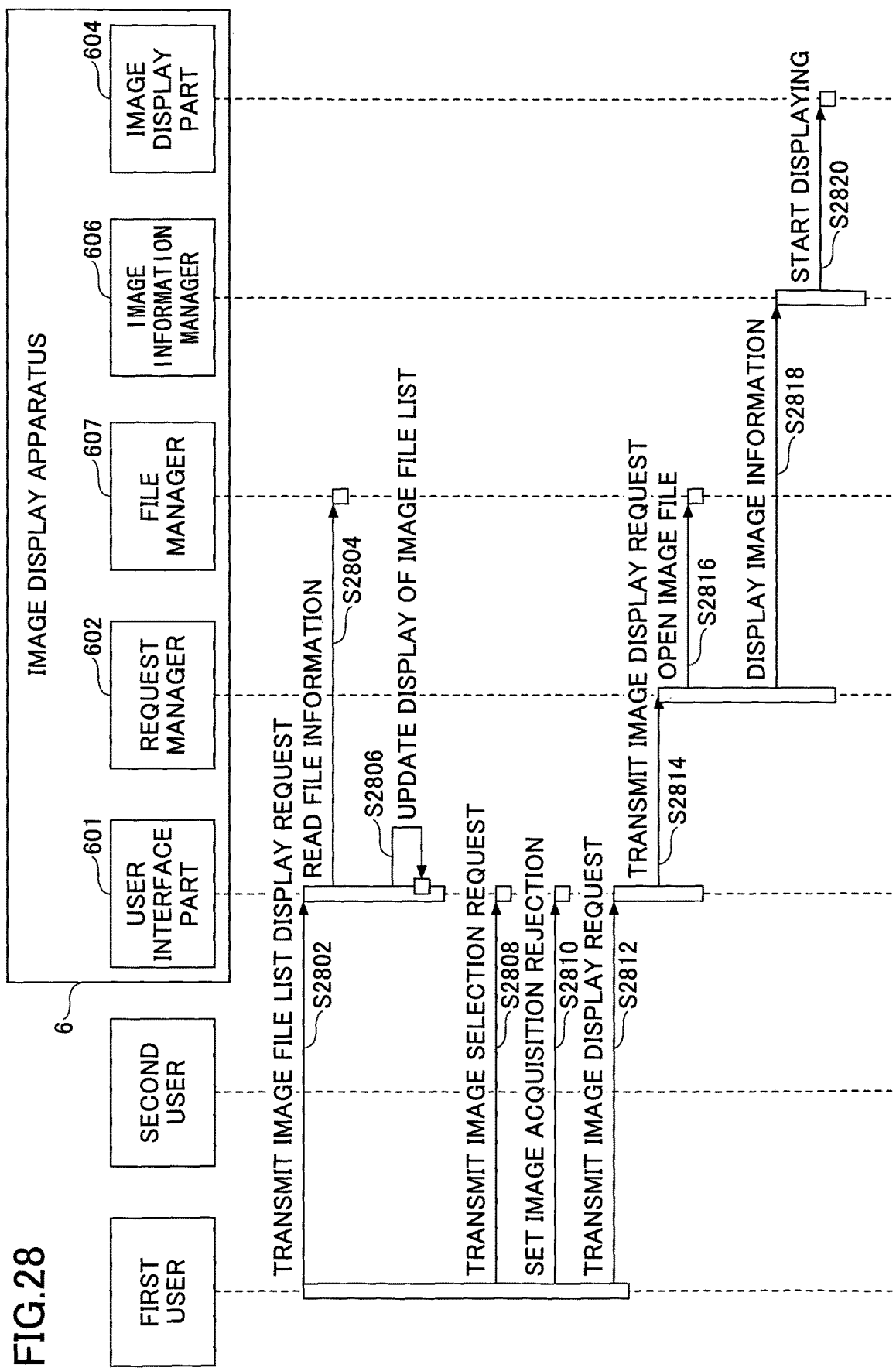
FIG. 28 is a sequence diagram illustrating an example (4) of operations of the image display system.

FIG. 28 illustrates an example (4) of operations of the image display system.

In the example illustrated in FIG. 28, the image display apparatus 6 displays an image stored in the external storage device 7. This image includes the image information for which the acquisition of image information is set to be rejected. Hence, even when the information processing apparatus 5 transmits an image information acquisition request to request the acquisition of the image information of the image displayed by the image display apparatus 6, the information processing apparatus 5 is unable to acquire the image information.

In FIG. 28, the first user causes the image display apparatus 6 to display an image file stored in the external storage device 7. The second user corresponds to a user who conducts a search for the image display apparatus 6.

The user interface part 601 of the image display apparatus 6 receives an image file list display request from the first user (step S2802). When the user interface part 601 receives the image file list request transmitted by the first user, the user interface part 601 transmits a file information reading instruction to the file manager 607, and acquires file information read by the file manager 607 (step S2804).

The user interface part 601 updates a display of the image file list based on the file information acquired from the file manager 607 (step S2806). The user interface part 601 receives an image selection request from the first user (step S2808). The user interface part 601 receives an image acquisition rejection setting request from the first user (step S2810). The user interface part 601 receives an image display request from the first user (step S2812).

The user interface part 601 transmits the image display request to the request manager 602 in response to the image display request from the first user (step S2814). Note that the image display request specifies the image selected by the image selection request as well as setting the image information not to be acquired. The request manager 602 manages the image data of the image not to be acquired. The request manager 602 transmits an instruction to the file manager 607 to open the image file specified by the image display request in response to the image display request input by the user interface part 601 (step S2816).

The request manager 602 transmits an instruction to the image information manager 606 to display the image information (step S2818). The image information manager 606 transmits an instruction to the image display part 604 to start displaying the image (step S2820). Steps S2702 to S2720 illustrated in FIG. 27 may be applied to steps subsequent step S2820.

Figure 29:
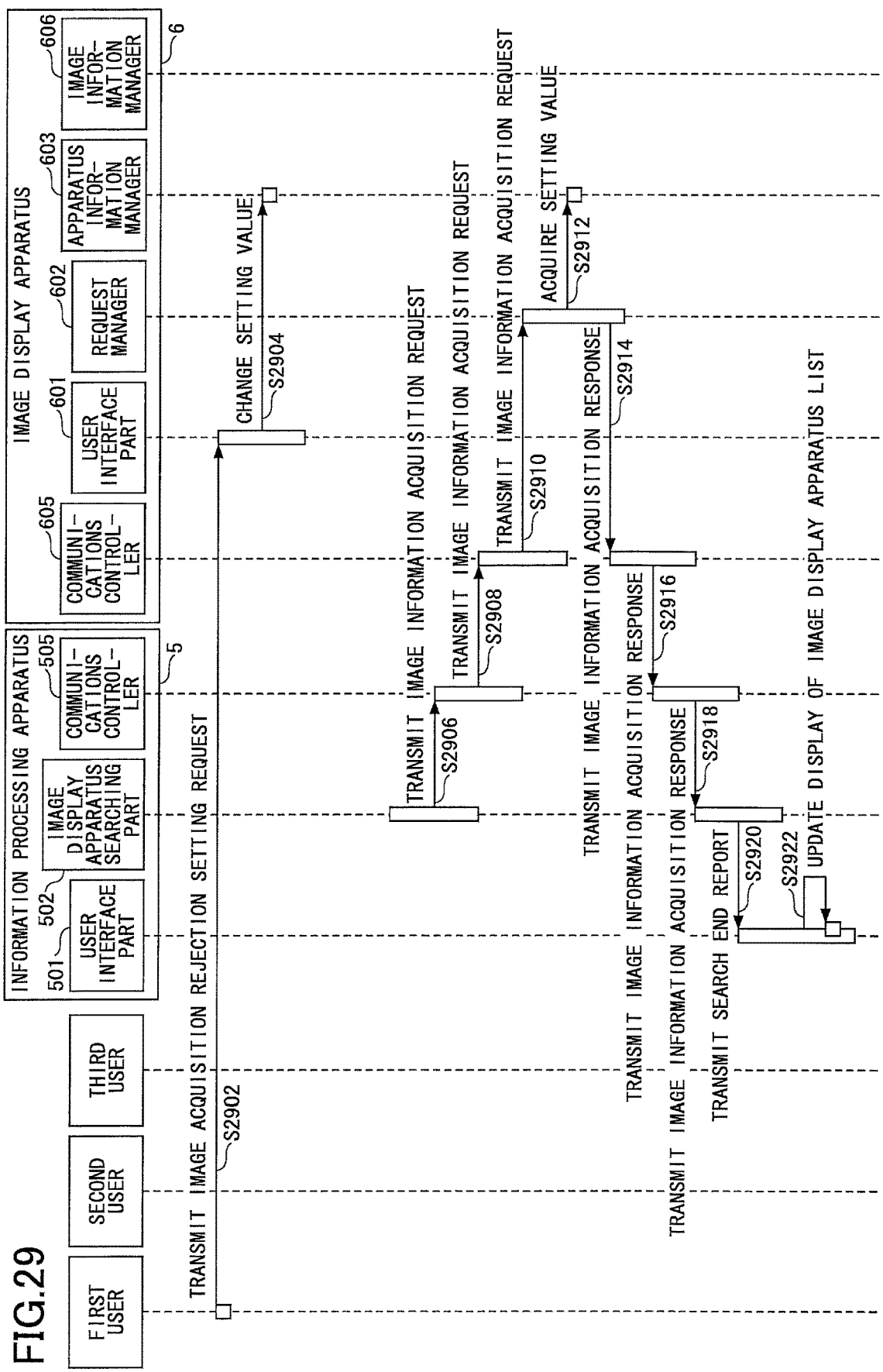
FIG. 29 is a sequence diagram illustrating an example (5) of operations of the image display system.

FIG. 29 illustrates an example (5) of operations of the image display system.

FIG. 29 illustrates an example in which the image information is set such that the image information is not to be acquired by the image display apparatus 6. Hence, even when the information processing apparatus 5 transmits an image information acquisition request to the image display apparatus 6, the information processing apparatus 5 is unable to acquire the image information from the image display apparatus 6.

In FIG. 29, the first user corresponds to a user who sets the image display apparatus 6 such that the image information is not to be acquired from the image display apparatus 6. The second user corresponds to a user of the information processing apparatus 5 that transmits an image to the image display apparatus 6. A third user corresponds to a user who conducts a search for the image display apparatus 6. FIG. 29 illustrates only one information processing apparatus 5; however, the information processing apparatus 5 used by the first user, the information processing apparatus 5 used by the second user, and the information processing apparatus 5 used by the third user differ from one another.

The user interface part 601 of the image display apparatus 6 receives an image acquisition rejection setting request from the first user (step S2902). When the user interface part 601 receives the image acquisition rejection setting request input by the first user, the user interface part 601 requests the apparatus information manager 603 to change the image acquisition capability setting to "reject" image acquisition (step S2904).

After step S2904 is processed, steps S2206 to S2214 illustrated in FIG. 22 are processed. That is, the second user selects the image display apparatus 6, and the image display data are transmitted from the information processing apparatus 5 to the selected image display apparatus 6. The image display apparatus 6 displays an image by processing the image data transmitted by the information processing apparatus 5. Note that it may be not necessary to apply the image acquisition rejection setting to the image data that are transmitted from the information processing apparatus 5 to the image display apparatus 6.

The information processing apparatus 5 of the third user is connected to the image display apparatus 6. The image display apparatus searching part 502 of the information processing apparatus 5 inputs the image information acquisition request into the communications controller 505 (step S2906). The image information acquisition request includes information about an image size to be acquired. The communications controller 505 transmits the image information acquisition request input by the image display apparatus searching part 502 to the image display apparatus 6 (step S2908).

The image information acquisition request transmitted by the information processing apparatus 5 is input into the communications controller 605 of the image display apparatus 6. The communications controller 605 inputs the image information acquisition request into the request manager 602 (step S2910). The request manager 602 receives the image information acquisition request input by the communications controller 605. The request manager 602 requests the apparatus information manager 603 to acquire image information; however, the acquisition of the image information is rejected. Hence, the request manager 602 acquires additional information (step S2912).

The request manager 602 inputs an image information acquisition response accompanied by the additional information into the communications controller 605 (step S2914). The communications controller 605 transmits the image information acquisition response input by the request manager 602 to the information processing apparatus 5 (step S2916).

The image information acquisition response transmitted by the image display apparatus 6 is input into the communications controller 505 of the information processing apparatus 5. The communications controller 505 inputs the image information acquisition response into the image display apparatus searching part 502 (step S2918). When the image display apparatus searching part 502 receives the image information acquisition response input by the communications controller 505, the image display apparatus searching part 502 transmits a search end report to the user interface part 501 (step S2920). When the user interface part 501 receives the search end report input by the image display apparatus searching part 502, the user interface part 501 updates a display of the image display apparatus list (step S2922). The image display apparatus list displays identification information, and does not display image information.

Figure 30:
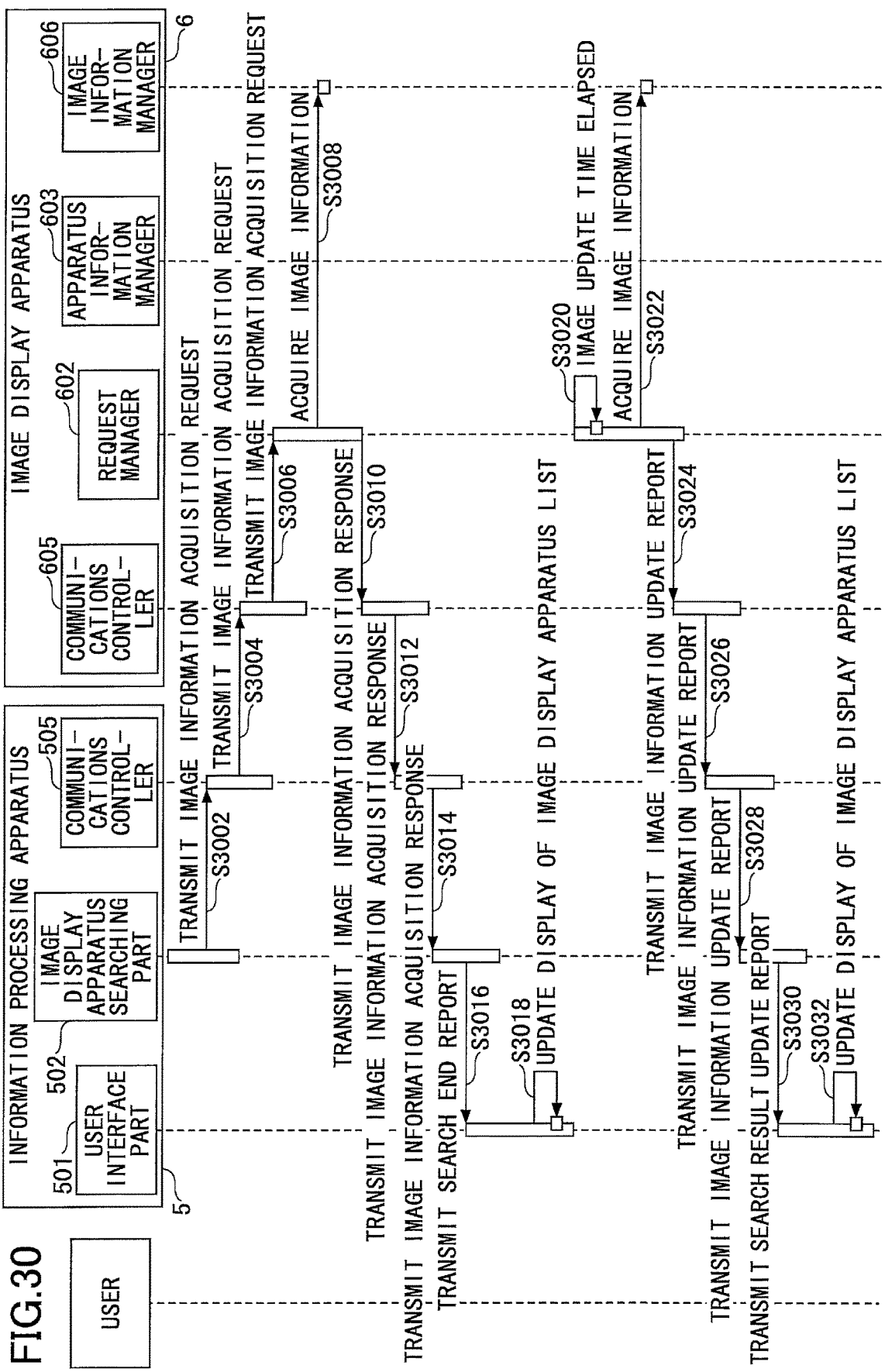
FIG. 30 is a sequence diagram illustrating an example (6) of, operations of the image display system.

FIG. 30 illustrates an example (6) of operations of the image display system.

In the example illustrated in FIG. 30, the image display apparatus 6 transmits the displayed image to the information processing apparatus 5 that transmits the image acquisition request at fixed intervals. Hence, even though the image displayed on the image display apparatus 6 is repeatedly updated, the user may be able to browse such an updated image.

The information processing apparatus 5 is connected to the image display apparatus 6. The image display apparatus searching part 502 of the information processing apparatus 5 inputs the image information acquisition request into the communications controller 505 (step S3002).

The communications controller 505 transmits the image information acquisition request input by the image display apparatus searching part 502 to the image display apparatus 6 (step S3004).

The image information acquisition request transmitted by the information processing apparatus 5 is input into the communications controller 605 of the image display apparatus 6. The communications controller 605 inputs the image information acquisition request into the request manager 602 (step S3006). The request manager 602 receives the image information acquisition request input by the communications controller 605. The request manager 602 transmits the image information acquisition request to the image information manager 606 to acquire the displayed image information (step S3008).

The request manager 602 inputs an image information acquisition response accompanied by image information into the communications controller 605 (step S3010). The communications controller 605 transmits the image information acquisition response input by the request manager 602 to the information processing apparatus 5 (step S3012).

The image information acquisition response transmitted by the image display apparatus 6 is input into the communications controller 505 of the information processing apparatus 5. The communications controller 505 inputs the image information acquisition response into the image display apparatus searching part 502 (step S3014). When the image display apparatus searching part 502 receives the image information acquisition response input by the communications controller 505, the image display apparatus searching part 502 transmits a search end report to the user interface part 501 (step S3016). When the user interface part 501 receives the search end report input by the image display apparatus searching part 502, the user interface part 501 updates a display of the image display apparatus list (step S3018).

The request manager 602 of the image display apparatus 6 detects that a preset image update time has elapsed (step S3020). The request manager 602 transmits the image information acquisition request to the image information manager 606 to acquire the displayed image information (step S3022). The request manager 602 inputs an image information update report accompanied by image information into the communications controller 605 (step S3024). The communications controller 605 transmits the image information update report input by the request manager 602 to the information processing apparatus 5 (step S3026).

The image information update report transmitted by the image display apparatus 6 is input into the communications controller 505 of the information processing apparatus 5. The communications controller 505 inputs the image information update report into the image display apparatus searching part 502 (step S3028). When the image display apparatus searching part 502 receives the image information update report input by the communications controller 505, the image display apparatus searching part 502 transmits a search result update report to the user interface part 501 (step S3030). When the user interface part 501 receives the search result update report input by the image display apparatus searching part 502, the user interface part 501 updates a display of the image display apparatus list (step S3032). The image information update report stops being transmitted when the image display apparatus 6 stops displaying the image, or when the information processing apparatus 5 requests the termination of transmitting the image information update report.

Figure 31:
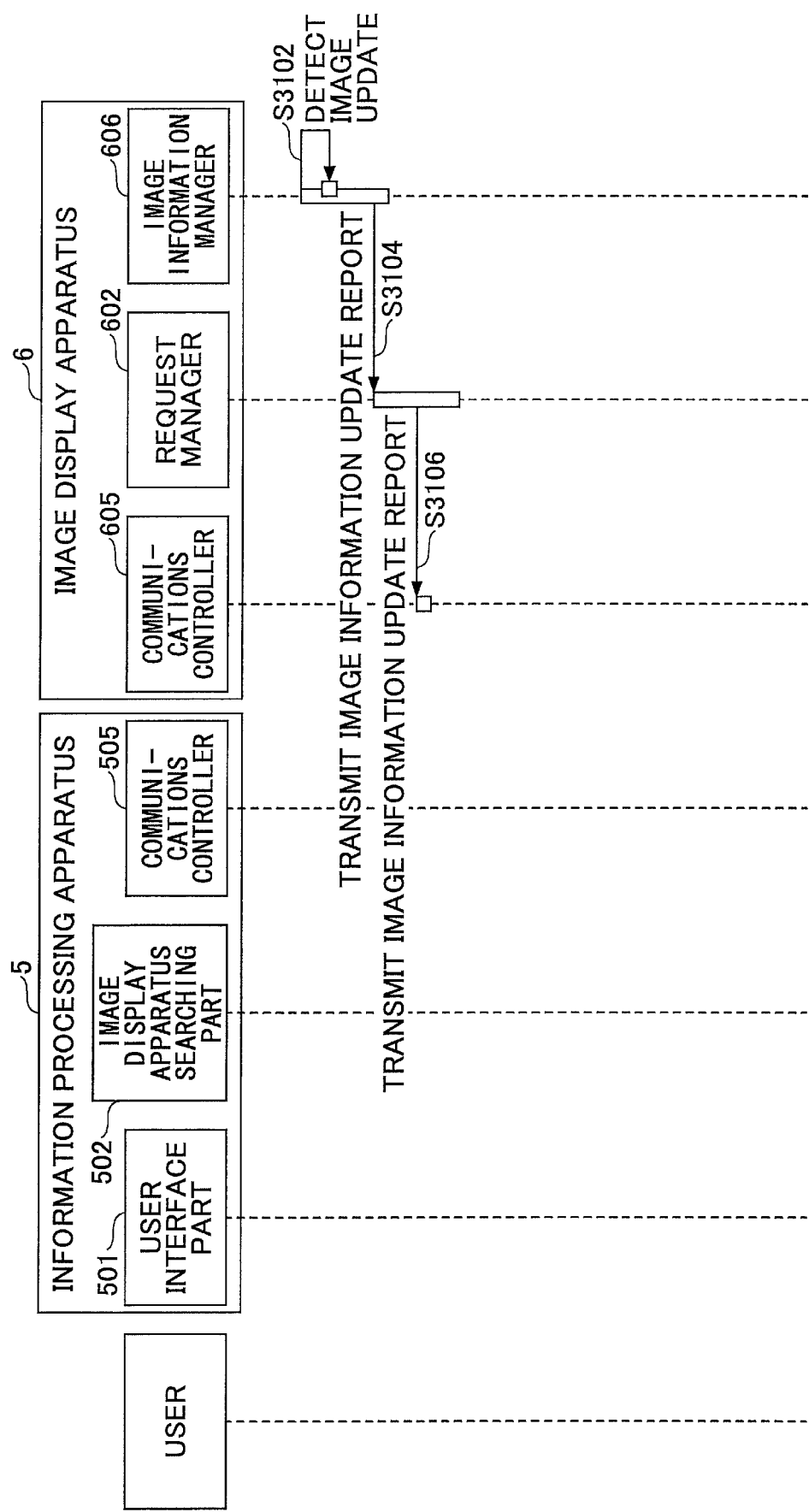
FIG. 31 is a sequence diagram illustrating an example (7) of operations of the image display system.

FIG. 31 illustrates an example (7) of operations of the image display system.

In the example illustrated in FIG. 31, when the image display apparatus 6 detects a change in the currently displaying image, the image display apparatus 6 transmits the image information of the changed image to the information processing apparatus 5 that has transmitted the image acquisition request. Hence, even though the image displayed on the image display apparatus 6 is changed, the user may be able to browse such a changed image.

After steps S3002 to S3018 illustrated in FIG. 30 have been conducted, the image information manager 606 of the image display apparatus 6 detects a change in the currently, displayed image (step S3104 When the image information manager 606 detects the change in the currently displayed image, the image information manager 606 inputs an image information update report into the request manager 602 (step S3104). The image information manager 606 may input the image information update report to the request manager 602 even though the currently displayed image has slightly changed, or may alternatively convert the difference between the previous and current images into a numeric value and input the image information update report when the numeric value representing the difference exceeds a predetermine threshold. The request manager 602 inputs the image information update report into the communications controller 605 (step S3106).

Steps S3026 to S3032 illustrated in FIG. 30 may be applied to steps subsequent step S3106.

The image display apparatus such as the related art network connection image projection apparatus employs identification information such as the IP address and the projector name to identify the image display apparatus subjected to connection. Hence, in an environment in which plural image display apparatuses are connected over the identical network, images or the like may be displayed on a wrong image display apparatus unless the own identification information is checked by displaying the own identification information on the display screens of the image display apparatuses. Specifically, when another information processing apparatus desires to access or connect to the image display apparatus currently displaying the image information that is already transmitted from another information processing apparatus, or that is read from the USB memory or the like, the identification information is unable to be displayed on the display screen unless the display of the image information is terminated, which has made it difficult to specify a desired one of the image display apparatuses.

The present embodiments may acquire image information currently displayed by the image display apparatus detected based on the connection information list, and display the acquired image information on the information processing apparatus as additional information of the image display apparatus. Hence, according to the present embodiments, the user may be able to specify the desired one of the image display apparatuses by comparing the image information displayed on the information processing apparatus with the image information displayed by the image display apparatuses to select the desired image display apparatus. Accordingly, when the image display apparatus subject to connection is specified from the image display apparatuses detected based on the connection information list, the user may be able to easily identify the desired image display apparatus subjected to connection.

Note that all of or part of the above-described embodiments may be implemented by a computer program. The program may be stored in a portable recording medium. The portable recording medium indicates a non-transitory recording medium. Examples of the portable recording medium include a magnetic recording medium, an optical disk, a magneto-optical medium, and a non-volatile memory. All of or part of the above-described embodiments may be implemented by causing a processor to read the computer program stored in the portable recording medium and execute the read computer program.

The preferred embodiments are described above; however, the image display apparatus such as the image projection apparatus may further include a function to manage connection information lists. In the preferred embodiments described above, the information processing apparatus is an example of a terminal, the image projection apparatus is an example of an image display apparatus, the storage device is an example of a first storage part or a second storage part, the connection information list manager is an example of an update part and a determination part, and the image projection apparatus searching part and the image display apparatus searching part are examples of an acquisition part.

In addition, the image projection connecting part and the image display apparatus connecting part are examples of a connecting part, the user interface part is an example of a display part, and the request manager is an example of a setting part.

In the above embodiments, the present invention is illustrated with specific examples; however, the present invention is not limited to these examples, and various alterations or changes may be made without departing from the gist and the scope of the claims of the present invention. Specifically, the present invention shall not be construed as being limited to details of the specific examples and accompanying drawings thereof.

The present application is based on and claims the benefit of Priority of Japanese Patent Application No. 2014-015274 filed Jan. 30, 2014, and Japanese Patent Application No. 2014-239818 filed Nov. 27, 2014, the entire contents of which are hereby incorporated herein by reference.

DESCRIPTION OF THE REFERENCE NUMERALS 1 (1a, 1b, 1c) Information processing apparatus
2 Network
3 (3a, 3b) Image projection apparatus
5 (5a, 5b, 5c) Information processing apparatus
6 (6a, 6b, 6c, 6d) Image display apparatus
7 External storage device
101 User interface part
102 Image projection apparatus searching part
103 Connection information list manager
104 Image projection apparatus connecting part
105 Communications controller
106 Projection data creating part
111 Connectable model storage part
501 User interface part
502 Image display apparatus searching part
503 Connection information list manager
504 Image display apparatus connecting part
505 Communications controller
506 Display data creating part
601 User interface part
602 Request manager
603 Apparatus information manager
604 Image display part
605 Communications controller
606 Image information manager
607 File manager

RELATED ART DOCUMENTS

Patent Document

Patent Document 1: Japanese Laid-open Patent Publication No. 2009-53733

The invention claimed is:

1. An image display system, comprising:
a plurality of terminals;
a particular terminal that includes a display and circuitry; and
a plurality of image display apparatuses that communicate with the plurality of terminals via a network, and that are each configured to display a local image based on image data received from a corresponding terminal of the plurality of terminals, wherein
the circuitry is configured to
receive, from each image display apparatus of the plurality of image display apparatuses, image data of the local image currently being displayed by the image display apparatus, the local image being displayed based on the image data received from the corresponding terminal of the plurality of terminals;
automatically control the display of the particular terminal to display each of the local images currently being displayed on each of the image display apparatuses, based on the corresponding image data received from each image display apparatus of the plurality of image display apparatuses; and
connect to a particular image display apparatus, of the plurality of image display apparatuses, that displays a particular local image selected by a user from the local images displayed by the display of the particular terminal.

2. The image display system as claimed in claim 1, wherein
when the local images displayed on the respective image display apparatuses are images stored in an external storage device, the circuitry is further configured to acquire identification information of image information files of the images, and
the display displays the identification information of the image information files.

3. The image display system as claimed in claim 1, wherein the circuitry is further configured to
set a capability of acquiring image information of the displayed local images in each of the respective image display apparatuses, and
acquire the image information from each of the image display apparatuses according to the set capability.

4. The image display system as claimed in claim 1, wherein the circuitry is further configured to
perform an image process with respect to the local images displayed on the image display apparatuses, and
acquire processed image information of the processed local images.

5. The image display system of claim 1, wherein the circuitry is configured to connect to the particular image display apparatus when the particular local image is selected by the user from the local images displayed by the display of the particular terminal.

6. The image display system of claim 1, wherein each of the plurality of image display apparatuses is configured to display the local image based on the corresponding image data, which is received from the corresponding terminal of the plurality of terminals via the network.

7. A terminal device, comprising:
a display; and
circuitry configured to
receive, from each image display apparatus of a plurality of image display apparatuses that communicate with a plurality of terminals via a network, and that are each configured to display a local image based on image data received from a corresponding terminal of the plurality of terminals, the image data of the local image currently being displayed by the image display apparatus, the local image being displayed based on the image data received from the corresponding terminal of the plurality of terminals;
automatically control the display to display each of the local images currently being displayed on each of the image display apparatuses, based on the corresponding image data received from each image display apparatus of the plurality of image display apparatuses; and
connect to a particular image display apparatus, of the plurality of image display apparatuses, that displays a local particular image selected by a user from the local images displayed by the display of the terminal device.

8. The terminal device as claimed in claim 7, wherein when the local images displayed on the respective image display apparatuses are images stored in an external storage device, the circuitry is further configured to acquire identification information of image information files of the images, and the display displays the identification information of the image information files.

9. The terminal device as claimed in claim 7, wherein the circuitry is further configured to
set a capability of acquiring image information of the displayed local images in each of the respective image display apparatuses, and
acquire the image information from each of the image display apparatuses according to the set capability.

10. The terminal device as claimed in claim 7, wherein the circuitry is further configured to
perform an image process with respect to the local images displayed on the image display apparatuses, and
acquire processed image information of the processed local images.

11. The terminal device of claim 7, wherein the circuitry is configured to connect to the particular image display apparatus when the particular local image is selected by the user from the local images displayed by the display of the terminal device.

12. The terminal device of claim 7, wherein the circuitry is further configured to receive the corresponding image data from each image display apparatus of the plurality of image display apparatuses via the network.

13. An image display method by a particular terminal device that includes a display and circuitry, the image display method comprising:
receiving, by the circuitry from each image display apparatus of a plurality of image display apparatuses that communicate with a plurality of terminals via a network, and that are each configured to display a local image based on image data received from a corresponding terminal of the plurality of terminals, the image data of the local image currently being displayed by the image display apparatus, the local image being displayed based on the image data received from the corresponding terminal of the plurality of terminals;
automatically controlling the display of the particular terminal device to display each of the local images currently being displayed on each of the image display apparatuses, based on the corresponding image data received from each image display apparatus of the plurality of image display apparatuses; and
connecting to a particular image display apparatus, of the plurality of image display apparatuses, that displays a particular local image selected by a user from the local images displayed by the display of the particular terminal device.

14. The image display method as claimed in claim 13, further comprising:
acquiring, when the local images displayed on the respective image display apparatuses are images stored in an external storage device, identification information of image information files of the images; and
displaying the identification information of the image information files.

15. The image display method as claimed in claim 13, further comprising:
setting a capability of acquiring image information of the displayed local images in each of the respective image display apparatuses; and
acquiring the image information from each of the image display apparatuses according to the set capability.

16. The image display method as claimed in claim 13, further comprising:
performing an image process with respect to the local images displayed on the image display apparatuses; and
acquiring processed image information of the processed local images.

17. The image display method of claim 13, wherein the connecting step comprises connecting to the particular image display apparatus when the particular local image is selected by the user from the local images displayed by the display of the particular terminal device.

18. The image display method as claimed in claim 13, wherein the receiving step comprises receiving, by the circuitry from each image display apparatus of the plurality of image display apparatuses, the corresponding image data via the network.

* * * * *